US012179489B2

(12) United States Patent
Murakami et al.

(10) Patent No.: US 12,179,489 B2
(45) Date of Patent: Dec. 31, 2024

(54) LIQUID EJECTING HEAD AND LIQUID EJECTING APPARATUS

(71) Applicant: SEIKO EPSON CORPORATION, Tokyo (JP)

(72) Inventors: Kentaro Murakami, Shiojiri (JP); Katsuhiro Okubo, Azumino (JP); Takahiro Kanegae, Shiojiri (JP); Haruhisa Uezawa, Shiojiri (JP); Hiroki Kobayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 77 days.

(21) Appl. No.: 18/088,810

(22) Filed: Dec. 27, 2022

(65) Prior Publication Data

US 2023/0202185 A1 Jun. 29, 2023

(30) Foreign Application Priority Data

Dec. 28, 2021 (JP) ................................ 2021-214477

(51) Int. Cl.

*B41J 2/14* (2006.01)
*B41J 2/175* (2006.01)

(52) U.S. Cl.

CPC ....... *B41J 2/14233* (2013.01); *B41J 2/14201* (2013.01); *B41J 2/17563* (2013.01); *B41J 2002/14241* (2013.01)

(58) Field of Classification Search

CPC ................ B41J 2/14233; B41J 2/14201; B41J 2/17563; B41J 2002/14241

See application file for complete search history.

(56) References Cited

U.S. PATENT DOCUMENTS 10,682,854 B2 * 6/2020 Yazaki .................. B41J 2/1642
2021/0268796 A1 9/2021 Takino

FOREIGN PATENT DOCUMENTS

JP 2016-000461 A 1/2016
JP 2021-133604 A 9/2021

* cited by examiner

*Primary Examiner* — Geoffrey S Mruk

(74) *Attorney, Agent, or Firm* — Harness, Dickey & Pierce, P.L.C.

(57) ABSTRACT

A liquid ejecting head includes: a nozzle row configured by arranging nozzles ejecting a liquid in a first-direction in a second-direction orthogonal to the first-direction; a drive element; and stacked components defining a common liquid chamber communicating with the nozzle row, in which the stacked components include a filter partitioning the common liquid chamber into an upstream common liquid chamber and a downstream common liquid chamber, a first-case defining a first-common-liquid-chamber-portion as a part of the upstream common liquid chamber and stacked on the filter, and a second-case defining a second-common-liquid-chamber-portion as a part of the upstream common liquid chamber and stacked on the first-case, the second-common liquid-chamber-portion is positioned in a direction opposite to the first-direction from the drive element, and a width of the second-common-liquid-chamber-portion in a third-direction orthogonal to the first-direction and the second-direction is longer than a width of the first-common-liquid-chamber-portion in the third-direction.

15 Claims, 10 Drawing Sheets

LIQUID EJECTING HEAD AND LIQUID EJECTING APPARATUS

The present application is based on, and claims priority from JP Application Serial Number 2021-214477, filed Dec. 28, 2021, the disclosure of which is hereby incorporated by reference herein in its entirety.

BACKGROUND

1. Technical Field

The present disclosure relates to a liquid ejecting head and a liquid ejecting apparatus.

2. Related Art

In many cases, a liquid ejecting apparatus such as an ink jet printer is provided with a liquid ejecting head ejecting a liquid such as ink. For example, JP-A-2021-133604 discloses a liquid ejecting apparatus ejecting a liquid stored in a common liquid chamber from a nozzle. JP-A-2016-000461 discloses a liquid ejecting apparatus in which a common liquid chamber is provided with a filter.

When the filter described in JP-A-2016-000461 is provided in the common liquid chamber described in JP-A-2021-133604, the pressure loss of the liquid in the common liquid chamber increases and the ejection characteristics of the nozzle deteriorate. The ejection characteristic is one or both of the amount and rate of ejection. In order to suppress the increase in liquid pressure loss, it is necessary to increase the size of the common liquid chamber. However, with high-density liquid ejecting apparatuses desired nowadays, increasing the size of the common liquid chamber while maintaining the size of the liquid ejecting head leads to a complex common liquid chamber shape and liquid ejecting head manufacturing becomes difficult. As described above, in the liquid ejecting apparatuses of the related art, it is difficult to suppress an increase in liquid pressure loss when the filter is provided in the common liquid chamber.

SUMMARY

In order to solve the above problems, a liquid ejecting head according to a preferred aspect of the present disclosure includes: a nozzle row configured by arranging a plurality of nozzles ejecting a liquid in a first direction in a second direction orthogonal to the first direction; a drive element for ejecting the liquid from the plurality of nozzles of the nozzle row; and a plurality of stacked components defining a common liquid chamber communicating with the plurality of nozzles of the nozzle row, in which the plurality of stacked components include a filter partitioning the common liquid chamber into an upstream common liquid chamber and a downstream common liquid chamber, a first case defining a first common liquid chamber portion as a part of the upstream common liquid chamber and stacked on the filter, and a second case defining a second common liquid chamber portion as a part of the upstream common liquid chamber and stacked on the first case, the second common liquid chamber portion is positioned in a direction opposite to the first direction from the drive element, and a width of the second common liquid chamber portion in a third direction orthogonal to the first direction and the second direction is longer than a width of the first common liquid chamber portion in the third direction.

A liquid ejecting apparatus according to a preferred aspect of the present disclosure includes: the liquid ejecting head according to the above aspect; and a liquid storage portion storing the liquid to be supplied to the liquid ejecting head.

DESCRIPTION OF EXEMPLARY EMBODIMENTS

Hereinafter, an embodiment for carrying out the present disclosure will be described with reference to the drawings. However, in each drawing, the dimensions and scale of each portion are appropriately different from the actual ones. In addition, although the embodiment described below is a preferred specific example of the present disclosure and thus various technically preferable limitations are attached, the scope of the present disclosure is not limited to these forms unless there is a description to the effect that the present disclosure is particularly limited in the following description.

For the sake of convenience, the following description will be made using the mutually intersecting X axis, Y axis, and Z axis as appropriate. In addition, in the following description, one direction along the X axis is the X1 direction, and the direction opposite to the X1 direction is the X2 direction. Similarly, the opposite directions along the Y axis are the Y1 direction and the Y2 direction. In addition, the opposite directions along the Z axis are the Z1 direction and the Z2 direction. In addition, viewing in the Z-axis direction may be simply referred to as "plan view". It should be noted that the Z2 direction is an example of "first direction". The Y1 direction or the Y2 direction is an example of "second direction". The X1 direction or the X2 direction is an example of "third direction".

Here, typically, the Z axis is a vertical axis, and the Z2 direction corresponds to the downward direction in the vertical direction. However, the Z axis does not have to be a vertical axis. In addition, although the X axis, the Y axis, and the Z axis are typically orthogonal to each other, the axes are not limited thereto and may intersect at an angle within the range of, for example, 80 degrees or more and 100 degrees or less.

1. First Embodiment

1-1. Schematic Configuration of Liquid Ejecting Apparatus

Figure 1:
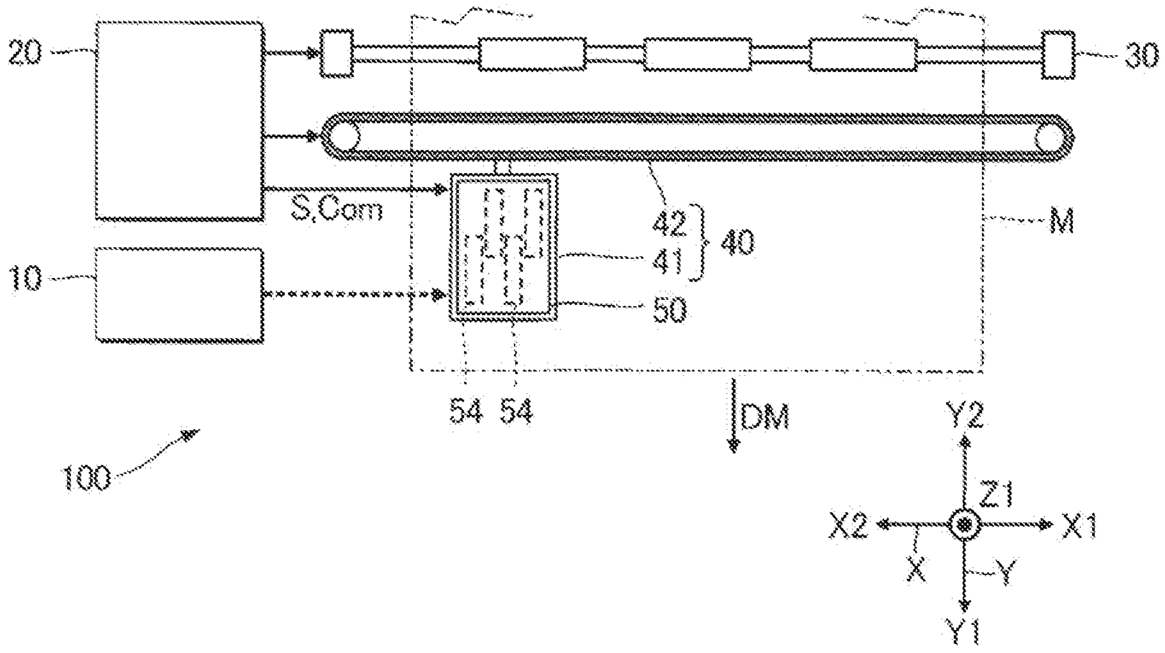
FIG. 1 is a schematic diagram exemplifying a liquid ejecting apparatus 100 according to a first embodiment.

FIG. 1 is a schematic diagram exemplifying a liquid ejecting apparatus 100 according to a first embodiment. The liquid ejecting apparatus 100 is an ink jet printing apparatus that ejects ink, which is an example of "liquid," onto a medium M as droplets. The medium M is typically printing paper. It should be noted that the medium M is not limited to printing paper and may be, for example, a printing target made of any material such as a resin film and fabric.

As illustrated in FIG. 1, the liquid ejecting apparatus 100 has a liquid storage portion 10, a control unit 20, a transport mechanism 30, a moving mechanism 40, and a liquid ejecting head 50.

The liquid storage portion 10 is an ink storage container. Specific aspects of the liquid storage portion 10 include, for example, a cartridge detachable from the liquid ejecting apparatus 100, a bag-shaped ink pack formed of a flexible film, and a container such as an ink-refillable ink tank.

Although not illustrated, the liquid storage portion 10 has a plurality of containers that store inks of different types. Although the inks stored in the plurality of containers are not particularly limited, examples thereof include cyan, magenta, yellow, black, clear, and white inks and a treatment liquid and combinations of two or more of these are used. It should be noted that each of the inks is not particularly limited in composition and may be, for example, a water-based ink in which a coloring material such as a dye and a pigment is dissolved in a water-based solvent, a solvent-based ink in which a coloring material is dissolved in an organic solvent, or an ultraviolet-curable ink.

The present embodiment exemplifies a configuration in which four different types of ink are used. The four types of ink are inks of different colors such as cyan, magenta, yellow, and black inks.

The control unit 20 controls the operation of each element of the liquid ejecting apparatus 100. For example, the control unit 20 includes a processing circuit such as a CPU and an FPGA and a memory circuit such as a semiconductor memory. CPU is an abbreviation for central processing unit. FPGA is an abbreviation for field programmable gate array. The control unit 20 outputs a drive signal Com and a control signal S toward the liquid ejecting head 50. The drive signal Com is a signal including a drive pulse driving the drive element of the liquid ejecting head 50. The control signal S is a signal specifying whether or not to supply the drive signal Com to the drive element.

The transport mechanism 30 transports the medium M in a transport direction DM, which is the Y1 direction, under the control of the control unit 20. The moving mechanism 40 causes the liquid ejecting head 50 to reciprocate in the X1 direction and the X2 direction under the control of the control unit 20. In the example illustrated in FIG. 1, the moving mechanism 40 has a substantially box-shaped support body 41 called a carriage that accommodates the liquid ejecting head 50 and a transport belt 42 to which the support body 41 is fixed. It should be noted that in addition to the liquid ejecting head 50, the liquid storage portion 10 described above may be mounted on the support body 41.

The liquid ejecting head 50 has a plurality of head chips 54 as will be described later and, under the control of the control unit 20, the ink supplied from the liquid storage portion 10 is ejected from each of a plurality of nozzles N of each head chip 54 toward the medium M in the Z2 direction, which is the ejection direction. This ejection is performed in parallel with the transport of the medium M by the transport mechanism 30 and the reciprocating movement of the liquid ejecting head 50 by the moving mechanism 40 and, as a result, a predetermined image is formed by the ink on the surface of the medium M.

1-2. Attachment State of Liquid Ejecting Head

Figure 2:
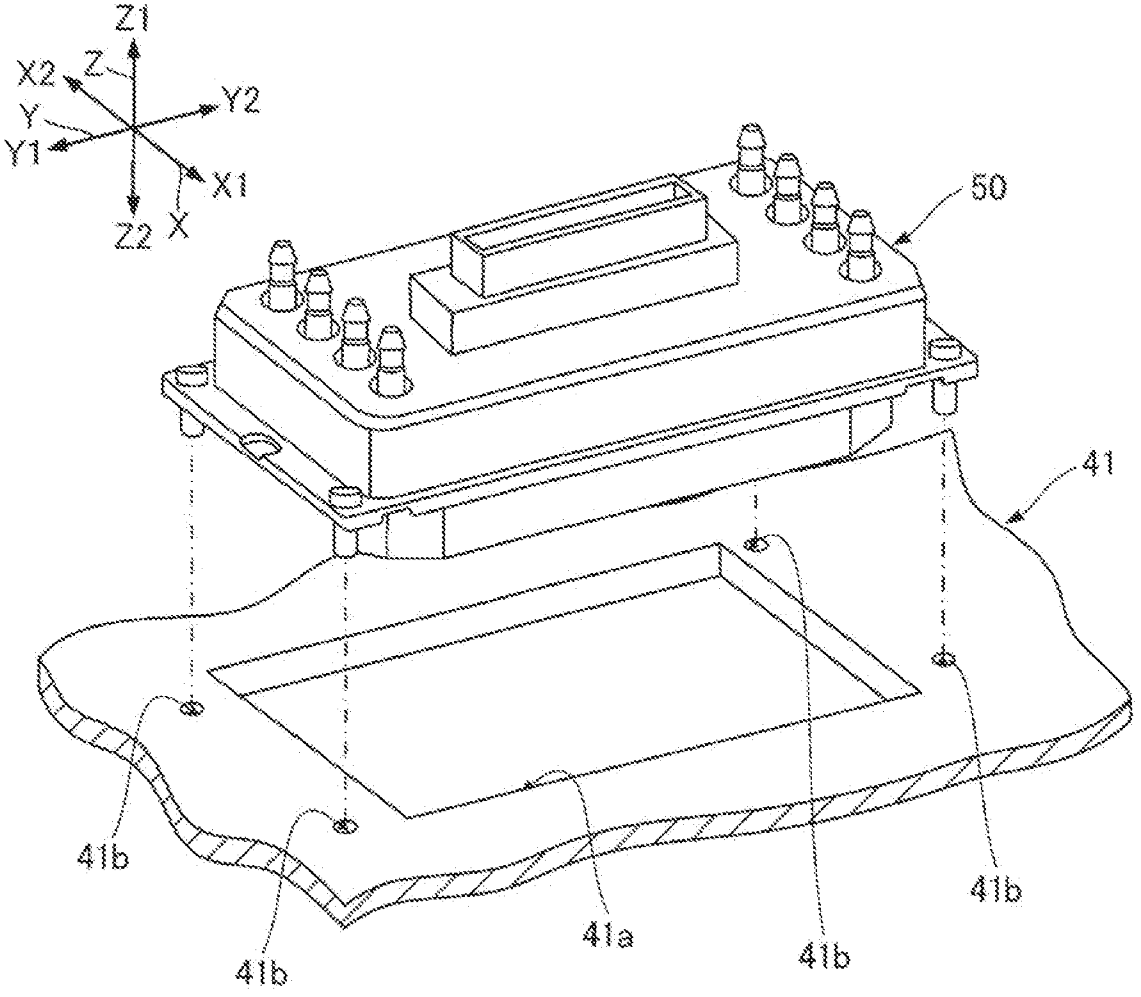
FIG. 2 is a perspective view of a liquid ejecting head 50 and a support body 41 according to the first embodiment.

FIG. 2 is a perspective view of the liquid ejecting head 50 and the support body 41 according to the first embodiment. As illustrated in FIG. 2, the liquid ejecting head 50 is supported by the support body 41. The support body 41 is a member that supports the liquid ejecting head 50 and, as described above, the support body 41 is a substantially box-shaped carriage in the present embodiment. Although the material configuring the support body 41 is not particularly limited, it is preferable to use, for example, a metal material such as stainless steel, aluminum, titanium, and magnesium alloy. When the support body 41 is made of a metal material, it is easy to increase the rigidity of the support body 41, and thus the liquid ejecting head 50 can be stably supported with respect to the support body 41.

Here, the support body 41 is provided with an opening 41*a* and a plurality of screw holes 41*b*. In the present embodiment, the support body 41 is substantially box-shaped with a plate-shaped bottom portion and, for example, the bottom portion is provided with the opening 41*a* and the plurality of screw holes 41*b*. The liquid ejecting head 50 is fixed to the support body 41 by screwing using the plurality of screw holes 41*b* in a state of being inserted in the opening 41*a*. The liquid ejecting head 50 is attached as above with respect to the support body 41.

In the example illustrated in FIG. 2, one liquid ejecting head 50 is attached to the support body 41. It should be noted that two or more liquid ejecting heads 50 may be attached to the support body 41. In this case, the support body 41 is appropriately provided with, for example, the openings 41*a* that correspond in number or shape to the number.

1-3. Configuration of Liquid Ejecting Head

Figure 3:
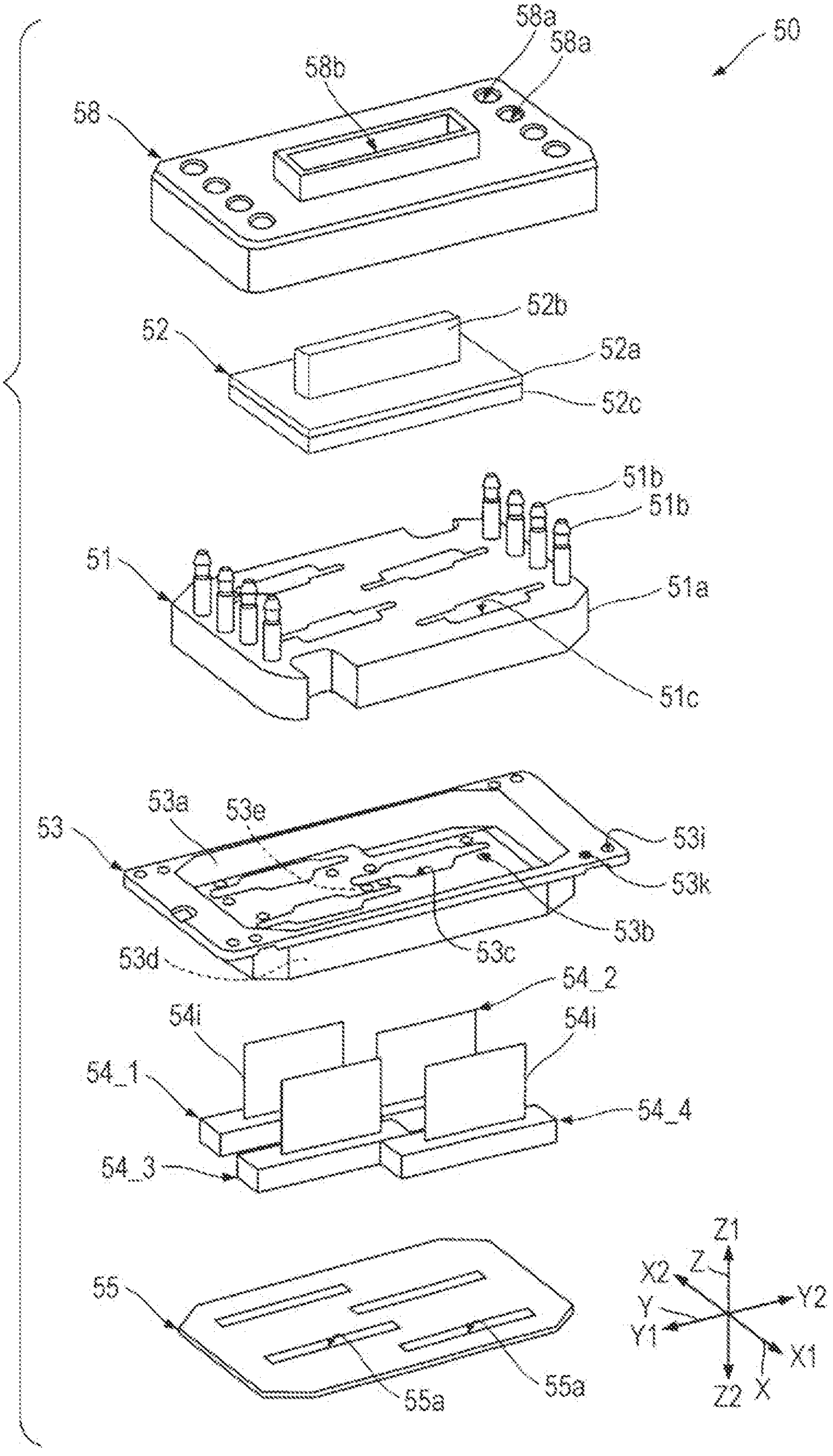
FIG. 3 is an exploded perspective view of the liquid ejecting head 50 according to the first embodiment.

FIG. 3 is an exploded perspective view of the liquid ejecting head 50 according to the first embodiment. As illustrated in FIG. 3, the liquid ejecting head 50 has a flow path structure 51, a substrate unit 52, a holder 53, four head chips 541 to 54_4, a fixing plate 55, and a cover 58. These are arranged in the order of the cover 58, the substrate unit 52, the flow path structure 51, the holder 53, the four head chips 54, and the fixing plate 55 in the Z2 direction. Each portion of the liquid ejecting head 50 will be described below.

The flow path structure 51 is a structure internally provided with flow paths for supplying the ink stored in the liquid storage portion 10 to the four head chips 54. The flow path structure 51 has a flow path member 51*a* and eight coupling pipes 51*b*.

Although not illustrated, the flow path member 51*a* is provided with four supply flow paths for four ink types and four discharge flow paths for four ink types. Each of the four supply flow paths has one inlet supplied with ink from the coupling pipe 51*b* and two outlets discharging the ink toward a coupling port IO of the head chip 54, which will be described later. Each of the four discharge flow paths has two inlets supplied with ink from the coupling port IO of the head chip 54 and one outlet discharging the ink to the coupling pipe 51*b*. The inlet of each supply flow path and the outlet of each discharge flow path are provided on the surface of the flow path member 51*a* facing the Z1 direction. In contrast, the outlet of each supply flow path and the inlet of each discharge flow path are provided on the surface of the flow path member 51*a* facing the Z2 direction.

In addition, a plurality of wiring holes 51*c* are provided in the flow path member 51*a*. Each of the plurality of wiring holes 51*c* is a hole through which a wiring substrate 54*i* of the head chip 54, which will be described later, is passed toward the substrate unit 52. It should be noted that the side surface of the flow path member 51*a* is provided with two notched parts in the circumferential direction. In addition, the flow path member 51*a* is provided with a hole (not illustrated) and is fixed with respect to the holder 53 by screwing using the hole.

Although not illustrated, the flow path member 51*a* has the configuration of a stacked body in which a plurality of substrates are stacked in the direction along the Z axis. It should be noted that in this specification, the expression of "elements A and B are stacked" is not limited to a configuration in which the element A and the element B come into direct contact with each other. In other words, a configuration in which another element C is interposed between the element A and the element B is also included in the concept of "elements A and B are stacked". Likewise, the expression of "the element B is formed on the surface of the element A" is not limited to a configuration in which the element A and the element B come into direct contact with each other. In other words, a configuration in which the element C is formed on the surface of the element A and the element B is formed on the surface of the element C is also included in the concept of "the element B is formed on the surface of the element A" insofar as the element A and the element B overlap at least in part in plan view.

Each of the plurality of substrates is appropriately provided with grooves and holes for the supply and discharge flow paths. The plurality of substrates are joined together by, for example, adhesive, brazing, welding, or screwing. In the following description, the plurality of substrates are described as being joined together using an adhesive. When the substrates are joined using the adhesive, the plurality of members are pressurized until the adhesive hardens after the adhesive is applied. It should be noted that when necessary, a sheet-shaped sealing member made of a rubber material or the like may be appropriately disposed between the plurality of substrates. In addition, the number, thickness, or the like of the substrates configuring the flow path member 51*a* is determined in accordance with an aspect such as the shapes of the supply and discharge flow paths, not particularly limited, and any.

Each of the eight coupling pipes 51*b* is a tube body protruding from the surface of the flow path member 51*a* facing the Z1 direction. The eight coupling pipes 51*b* correspond to the four supply flow paths and the four discharge flow paths described above and are coupled to the inlets of the corresponding supply flow paths or the outlets of the corresponding discharge flow paths.

Of the eight coupling pipes 51*b*, the four coupling pipes 51*b* corresponding to the four supply flow paths are coupled to the liquid storage portion 10 so as to be supplied with different types of ink. Meanwhile, the four coupling pipes 51*b* corresponding to the four discharge flow paths among the eight coupling pipes 51*b* are used after coupling to, for example, a discharge container for ink discharge at a predetermined time such as initial filling of the liquid ejecting head 50 with ink or a sub-tank disposed between the liquid storage portion 10 and the liquid ejecting head 50 and capable of holding ink. On normal occasions such as printing, the four coupling pipes 51*b* corresponding to the four discharge flow paths are blocked by a sealing body such as a cap. It should be noted that when the liquid storage portion 10 is coupled to the liquid ejecting head 50 via a circulation mechanism, the four coupling pipes 51*b* corresponding to the four discharge flow paths are normally coupled to the ink recovery flow path of the circulation mechanism.

The substrate unit 52 is an assembly having a mounting component for electrically coupling the liquid ejecting head 50 to the control unit 20. The substrate unit 52 has a circuit substrate 52*a*, a connector 52*b*, and a support plate 52*c*.

The circuit substrate 52*a* is a printed wiring substrate such as a rigid wiring substrate having wiring for electrically coupling each head chip 54 and the connector 52*b*. The circuit substrate 52*a* is disposed on the flow path structure 51 via the support plate 52*c*, and the connector 52*b* is installed on the surface of the circuit substrate 52*a* facing the Z1 direction.

The connector 52*b* is a coupling component for electrically coupling the liquid ejecting head 50 and the control unit 20. The support plate 52*c* is a plate-shaped member for attaching the circuit substrate 52*a* with respect to the flow path structure 51. The circuit substrate 52*a* is mounted on one surface of the support plate 52*c*, and the circuit substrate 52*a* is fixed by screwing or the like with respect to the support plate 52*c*. In addition, the other surface of the support plate 52*c* is in contact with the flow path structure 51 and, in that state, the support plate 52*c* is fixed to the flow path structure 51 by screwing or the like. The material configuring the support plate 52*c* is a resin material such as modified polyphenylene ether resin such as Zylon, polyphenylene sulfide resin, and polypropylene resin. It should be noted that Zylon is a registered trademark. The material configuring the support plate 52*c* may include, for example, a fiber base material such as glass fiber or a filler such as alumina particles in addition to the resin material.

The holder 53 is a structure that accommodates and supports the four head chips 54. The holder 53 is a structure that accommodates and supports the four head chips 54. The holder 53 is substantially tray-shaped and has a recess 53*a*, a plurality of ink holes 53*b*, a plurality of wiring holes 53*c*, a plurality of recesses 53*d*, a plurality of holes 53*e*, a plurality of screw holes 53*i*, and a plurality of screw holes 53*k*. The recess 53*a* is open in the Z1 direction and is a space in which the flow path member 51*a* is disposed. Each of the plurality of ink holes 53*b* is a flow path through which ink flows between the head chip 54 and the flow path structure 51. Each of the plurality of wiring holes 53*c* is a hole through which the wiring substrate 54*i* of the head chip 54 is passed toward the substrate unit 52. Each of the plurality of recesses 53*d* is open in the Z2 direction and is a space in which the head chip 54 is disposed. The plurality of holes 53*e* are flow paths for respectively coupling the plurality of coupling ports IO of the plurality of head chips 54, which will be described later, and the outlets of the supply flow paths and the inlets of the discharge flow paths of the flow path member 51*a*. The plurality of screw holes 53*i* are screw holes for screwing the holder 53 with respect to the support body 41. The plurality of screw holes 53*k* are screw holes for screwing the cover 58 with respect to the holder 53.

Each head chip 54 ejects ink. Each head chip 54 has the plurality of nozzles N ejecting a first ink and the plurality of nozzles N ejecting a second ink different in type from the first ink. Here, the first ink and the second ink are two of the four types of ink described above. For example, the head chip 54_1 and the head chip 542 use two of the four types of ink as the first ink and the second ink, respectively. Further, the other two of the four types of ink are used for the head chip 54_3 and the head chip 54_4, respectively. Each head chip 54 is provided with the wiring substrate 54*i*. It should be noted that in FIG. 3, the configuration of each head chip 54 is illustrated in a simplified manner. The configuration of the head chip 54 will be described in detail with reference to FIG. 4, which will be described later.

The fixing plate 55 is a plate-shaped member to which the four head chips 54 and the holder 53 are fixed. Specifically, the fixing plate 55 is disposed in a state where the four head chips 54 are sandwiched between the holder 53 and the fixing plate 55, and each head chip 54 and the holder 53 are fixed with an adhesive or the like. The fixing plate 55 is provided with a plurality of opening portions 55*a* exposing nozzle surfaces FN of the four head chips 54. In the example illustrated in FIG. 3, the plurality of opening portions 55*a* are individually provided for each head chip 54. The fixing plate 55 is made of, for example, a metal material such as stainless steel, titanium, and magnesium alloy.

The cover 58 is a box-shaped member that accommodates the substrate unit 52. The cover 58 is made of a resin material such as modified polyphenylene ether resin, polyphenylene sulfide resin, and polypropylene resin as in the case of the support plate 52*c* described above.

The cover 58 is provided with eight through holes 58*a* and an opening portion 58*b*. The eight through holes 58*a* correspond to the eight coupling pipes 51*b* of the flow path structure 51, and the corresponding coupling pipes 51*b* are inserted into the respective through holes 58*a*. The connector 52*b* is passed through the opening portion 58*b* from the inside to the outside of the cover 58.

1-4. Configuration of Head Chip

Figure 4:
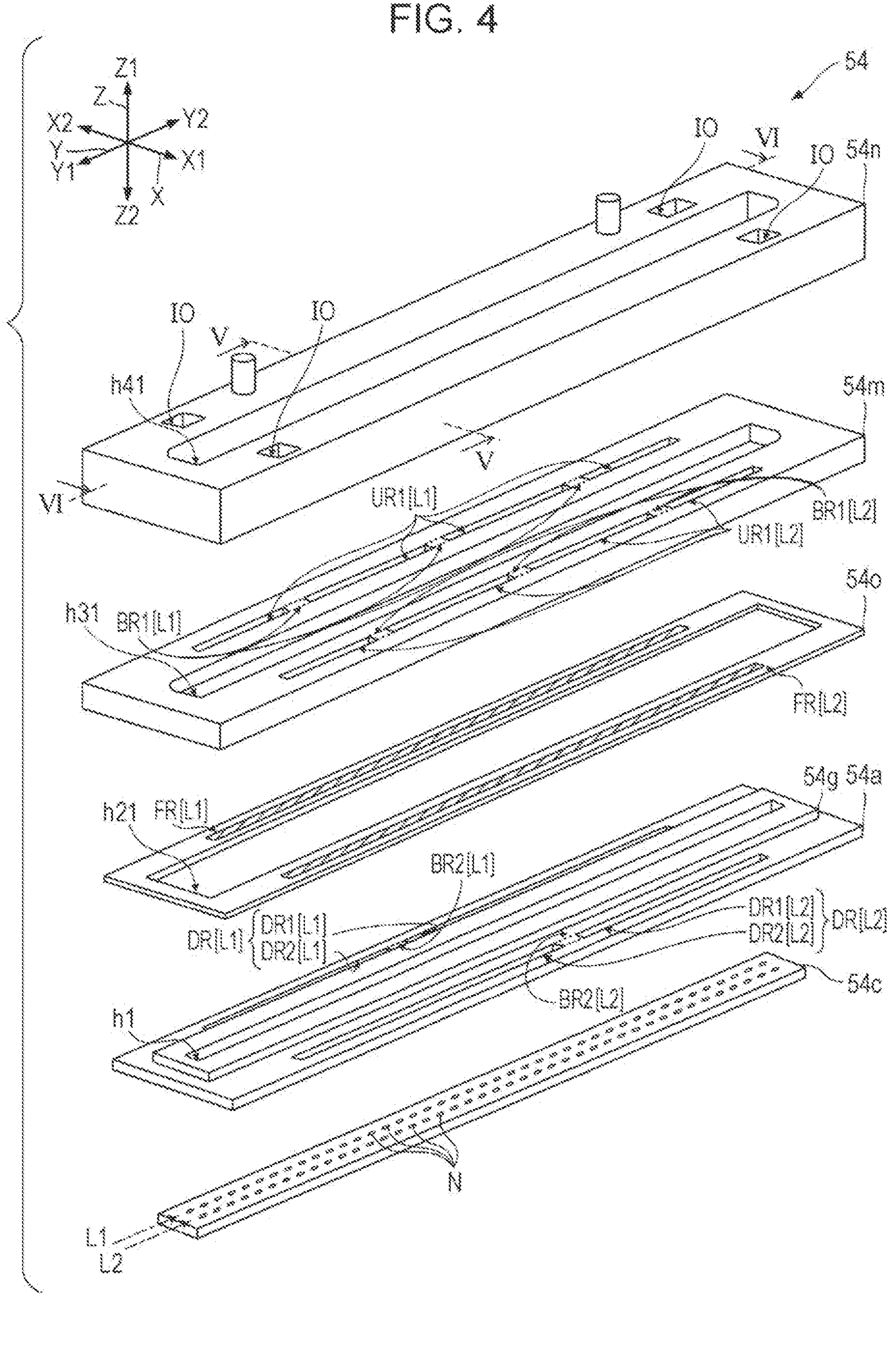
FIG. 4 is an exploded perspective view of a head chip 54.
Figure 5:
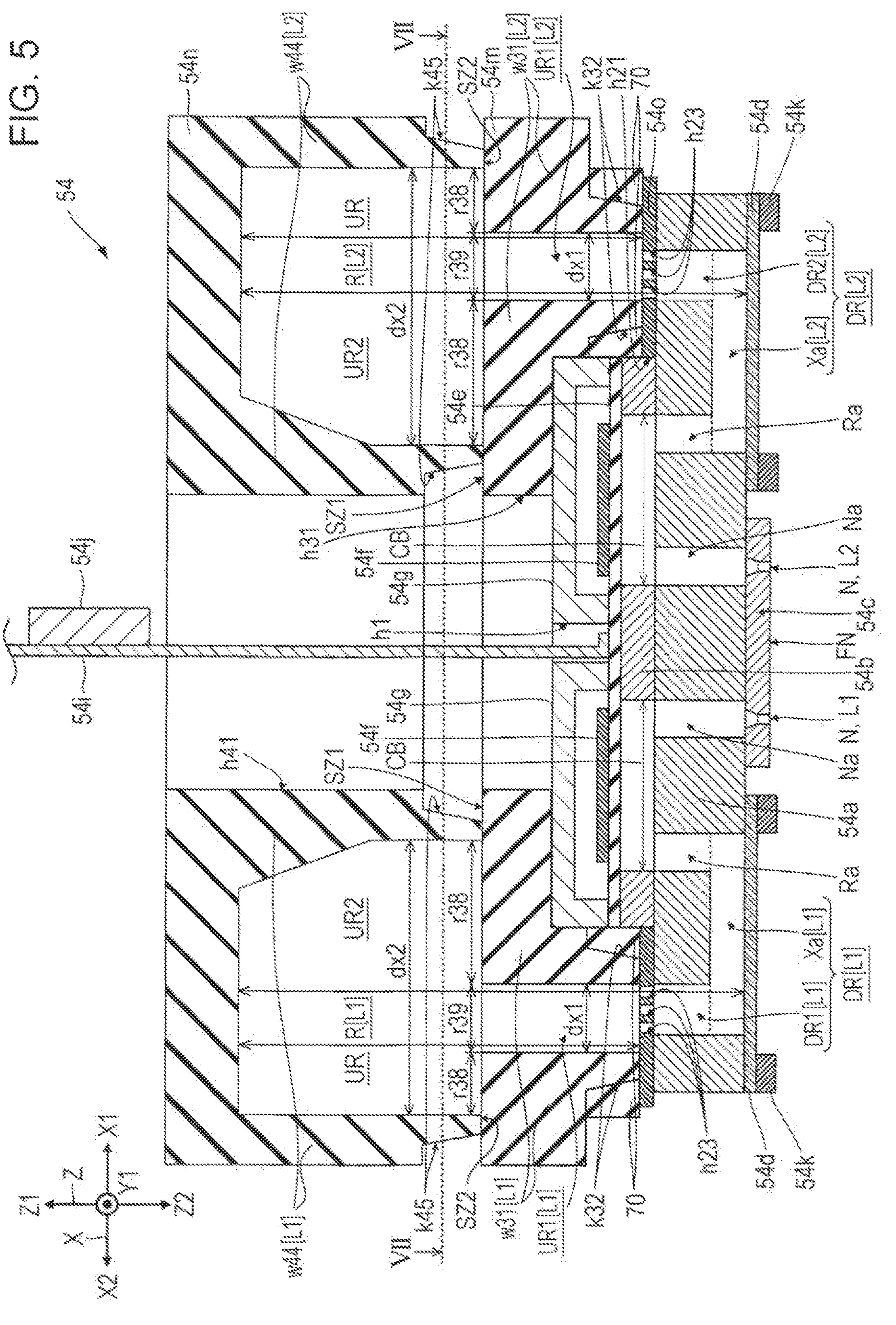
FIG. 5 is a cross-sectional view taken along line V-V in FIG. 4.
Figure 6:
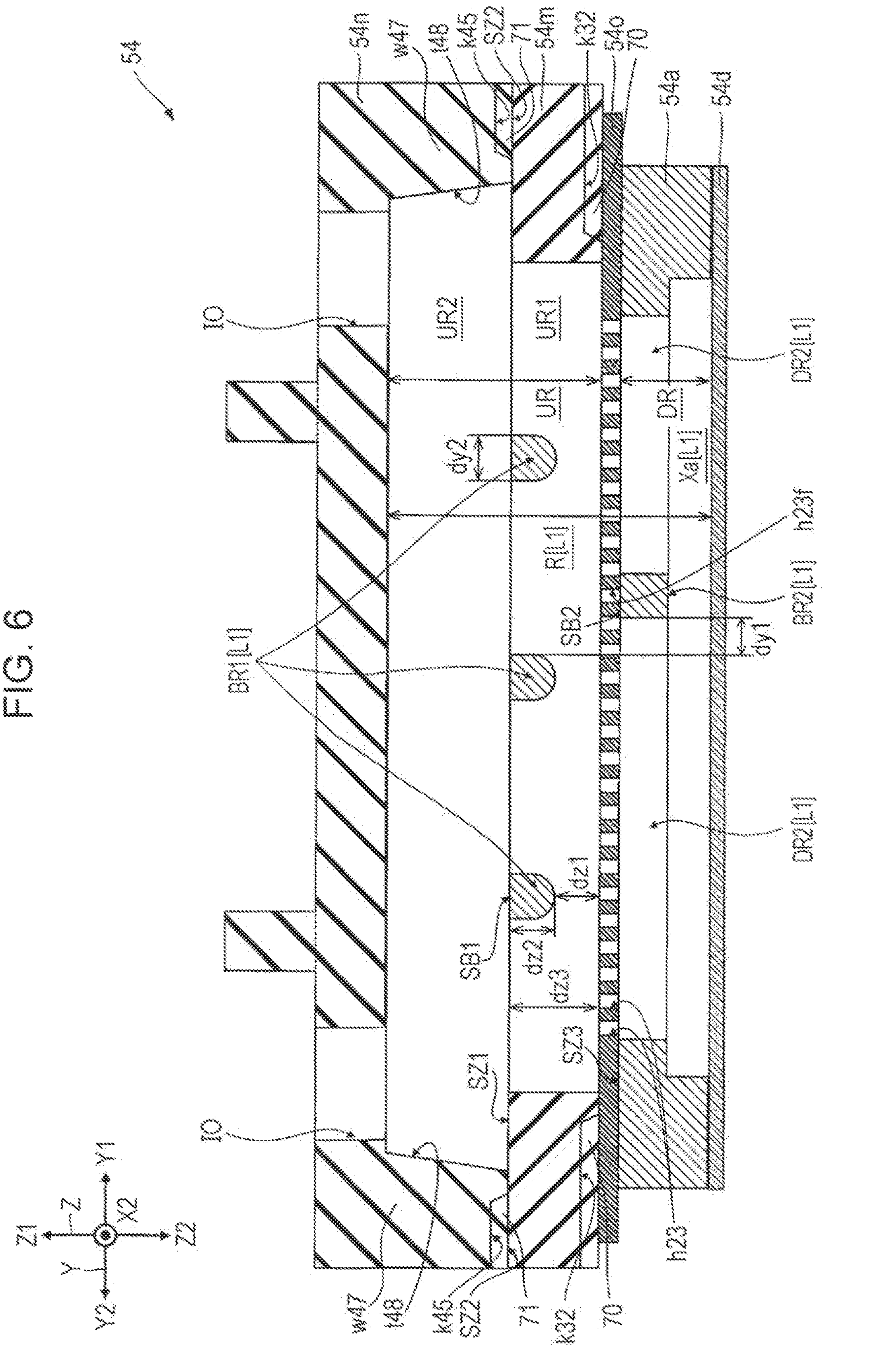
FIG. 6 is a cross-sectional view taken along line VI-VI in FIG. 4.

FIG. 4 is an exploded perspective view of the head chip 54. FIG. 5 is a cross-sectional view taken along line V-V in FIG. 4. FIG. 6 is a cross-sectional view taken along line VI-VI in FIG. 4. However, in FIG. 6, the wiring substrate 54*i* is unillustrated so that the drawing is not complicated. As illustrated in FIGS. 4 and 5, the head chip 54 has the plurality of nozzles N arranged in the direction along the Y axis. The plurality of nozzles N are divided into a first nozzle row L1 and a second nozzle row L2 spaced apart from each other in the direction along the X axis. Each of the first nozzle row L1 and the second nozzle row L2 is a set of the plurality of nozzles N linearly arranged in the direction along the Y axis.

The head chips 54 are configured to be substantially symmetrical to each other in the direction along the X axis. However, the positions of the plurality of nozzles N of the first nozzle row L1 and the plurality of nozzles N of the second nozzle row L2 in the direction along the Y axis may be the same or different. FIG. 5 exemplifies a configuration in which the positions of the plurality of nozzles N of the first nozzle row L1 and the plurality of nozzles N of the second nozzle row L2 match in the direction along the Y axis.

As illustrated in FIGS. 4 and 5, the head chip 54 has a communication plate 54*a*, a pressure chamber substrate 54*b*, a nozzle plate 54*c*, a vibration absorber 54*d*, a diaphragm 54*e*, a plurality of piezoelectric elements 54*f*, a protective substrate 54*g*, the wiring substrate 54*i*, a drive circuit 54*j*, a frame body 54*k*, a first case 54*m*, a second case 54*n*, and a filter 54*o*. However, in FIG. 4, the pressure chamber substrate 54*b*, the diaphragm 54*e*, the plurality of piezoelectric elements 54*f*, the vibration absorber 54*d*, the wiring substrate 54*i*, the drive circuit 54*j*, and the frame body 54*k* are unillustrated so that the drawing is not complicated.

The communication plate 54*a* and the pressure chamber substrate 54*b* are stacked in the Z1 direction in this order to form a flow path for ink supply to the plurality of nozzles N. Installed in the region positioned in the Z1 direction from the communication plate 54*a* are the filter 54*o*, the pressure chamber substrate 54*b*, the diaphragm 54*e*, the plurality of piezoelectric elements 54*f*, the protective substrate 54*g*, the first case 54*m*, the second case 54*n*, the wiring substrate 54*i*, and the drive circuit 54*j*. Meanwhile, the nozzle plate 54*c*, the vibration absorber 54*d*, and the frame body 54*k* are installed in the region positioned in the Z2 direction from the communication plate 54*a*. Each element of the head chip 54 is schematically a plate-shaped member elongated in the Y direction, and the elements are joined together using, for example, an adhesive. The elements of the head chip 54 will be described in order below.

The nozzle plate 54*c* is a plate-shaped member provided with the plurality of nozzles N of the first nozzle row L1 and the plurality of nozzles N of the second nozzle row L2. Each of the plurality of nozzles N is a through hole through which ink passes. Here, the surface of the nozzle plate 54*c* facing the Z2 direction is the nozzle surface FN. In other words, the normal direction of the nozzle surface FN is the direction of the normal vector of the nozzle surface FN and is the Z2 direction, which is the ejection direction. The nozzle plate 54*c* is manufactured by processing a silicon single crystal substrate with a semiconductor manufacturing technique using a processing technique such as dry etching and wet etching. However, other known methods and materials may be appropriately used for manufacturing the nozzle plate 54*c*. In addition, although the cross-sectional shape of the nozzle N is typically circular, the shape is not limited thereto and may be, for example, a non-circular shape such as polygonal and elliptical shapes.

The communication plate 54*a* is provided with a downstream common liquid chamber DR, a plurality of supply flow paths Ra, and a plurality of communication flow paths Na, which will be described later, for each of the first nozzle row L1 and the second nozzle row L2. Here, the downstream common liquid chamber DR communicating with the plurality of nozzles N of the first nozzle row L1 is expressed as a downstream common liquid chamber DR[L1]. The downstream common liquid chamber DR communicating with the plurality of nozzles N of the second nozzle row L2 is expressed as a downstream common liquid chamber DR[L2].

The downstream common liquid chamber DR[L1] includes an opening DR1[L1] penetrating the communication plate 54*a* in the Z-axis direction, an opening DR2[L1] penetrating the communication plate 54*a* in the Z-axis direction, and a coupling flow path Xa[L1]. The opening DR1[L1] and the opening DR2[L1] are divided by a communication plate beam portion BR2[L1] extending in the X-axis direction. Each of the opening DR1[L1] and the opening DR2[L1] extends in the Y-axis direction. Likewise, the downstream common liquid chamber DR[L2] includes an opening DR1[L2] penetrating the communication plate 54*a* in the Z-axis direction, an opening DR2[L2] penetrating the communication plate 54*a* in the Z-axis direction, and a coupling flow path Xa[L2]. The opening DR1[L2] and the opening DR2[L2] are divided by a communication plate beam portion BR2[L2] extending in the X-axis direction. Each of the opening DR1[L2] and the opening DR2[L2] extends in the Y-axis direction.

Here, when the openings DR1[L1] and DR1[L2] are not particularly distinguished, the openings are simply referred to as an opening DR1. In addition, when the coupling flow path Xa[L1] and the coupling flow path Xa[L2] are not particularly distinguished, the flow paths are simply referred to as a coupling flow path Xa. Further, when the openings DR2[L1] and DR2[L2] are not particularly distinguished, the openings are simply referred to as an opening DR2.

When the communication plate beam portion BR2[L1] and the communication plate beam portion BR2[L2] are not particularly distinguished, the portions are simply referred to as a communication plate beam portion BR2. Although one communication plate beam portion BR2 is provided corresponding to each of the first nozzle row L1 and the second nozzle row L2 in the example of FIG. 4, a plurality of the communication plate beam portions BR2 may be provided corresponding to the first nozzle row L1 and the second nozzle row L2. The communication plate beam portion BR2 is an example of "second beam portion".

The coupling flow path Xa communicates with the plurality of supply flow paths Ra at one end in the X-axis direction and communicates with both the opening DR1 and the opening DR2 at the other end in the X-axis direction. In other words, the ink that has passed through the openings DR1 and DR2 flows via the coupling flow path Xa to the plurality of supply flow paths Ra. Each of the supply flow path Ra and the communication flow path Na is a through hole formed for each nozzle N.

As illustrated in FIG. 5, a common liquid chamber R communicating with the plurality of nozzles N is provided for each of the first nozzle row L1 and the second nozzle row L2. In the following description, the common liquid chamber R communicating with the plurality of nozzles N of the first nozzle row L1 may be expressed as a common liquid chamber R[L1]. The common liquid chamber R communicating with the plurality of nozzles N of the second nozzle row L2 may be expressed as a common liquid chamber R[L2]. The common liquid chamber R stores ink supplied to a plurality of pressure chambers CB. The common liquid chamber R is defined by the vibration absorber 54$d$, the communication plate 54$a$, the filter 54$o$, the first case 54$m$, and the second case 54$n$. The vibration absorber 54$d$, the communication plate 54$a$, the filter 54$o$, the first case 54$m$, and the second case 54$n$ are an example of "plurality of stacked components". The filter 54$o$ partitions the common liquid chamber R into an upstream common liquid chamber UR and the downstream common liquid chamber DR. The communication plate 54$a$ defines a part of the downstream common liquid chamber DR.

The pressure chamber substrate 54$b$ is a plate-shaped member provided with the plurality of pressure chambers CB for each of the first nozzle row L1 and the second nozzle row L2. The plurality of pressure chambers CB are arranged in the direction along the Y axis. Each pressure chamber CB is an elongated space formed for each nozzle N and extending in the direction along the X axis in plan view. As in the case of the nozzle plate 54$c$ described above, each of the communication plate 54$a$ and the pressure chamber substrate 54$b$ is manufactured by processing a silicon single crystal substrate with, for example, a semiconductor manufacturing technique. However, other known methods and materials may be appropriately used for manufacturing the communication plate 54$a$ and the pressure chamber substrate 54$b$.

The pressure chamber CB is a space positioned between the communication plate 54$a$ and the diaphragm 54$e$. The plurality of pressure chambers CB are arranged in the direction along the Y axis for each of the first nozzle row L1 and the second nozzle row L2. In addition, the pressure chamber CB communicates with each of the communication flow path Na and the supply flow path Ra. Accordingly, the pressure chamber CB communicates with the nozzle N via the communication flow path Na and communicates with the downstream common liquid chamber DR via the supply flow path Ra.

The diaphragm 54$e$ is disposed on the surface of the pressure chamber substrate 54$b$ facing the Z1 direction. The diaphragm 54$e$ is a plate-shaped member capable of vibrating elastically. The diaphragm 54$e$ has, for example, a first layer and a second layer, and the first layer and the second layer are stacked in the Z1 direction in this order. The first layer is an elastic film made of, for example, silicon oxide. The elastic film is formed by, for example, thermally oxidizing one surface of a silicon single crystal substrate. The second layer is an insulating film made of, for example, zirconium oxide. The insulating film is formed by, for example, forming a zirconium layer by sputtering and thermally oxidizing the layer. It should be noted that the diaphragm 54$e$ is not limited to the configuration resulting from the stacking of the first and second layers described above and may be, for example, configured by a single layer or three or more layers.

On the surface of the diaphragm 54$e$ facing the Z1 direction, the plurality of piezoelectric elements 54$f$ corresponding to the nozzles N mutually are disposed as drive elements for each of the first nozzle row L1 and the second nozzle row L2. Each piezoelectric element 54$f$ is a passive element deformed by the drive signal Com being supplied. Each piezoelectric element 54$f$ has an elongated shape extending in the direction along the X axis in plan view. The plurality of piezoelectric elements 54$f$ are arranged in the direction along the Y axis so as to correspond to the plurality of pressure chambers CB. The piezoelectric element 54$f$ overlaps the pressure chamber CB in plan view.

Although not illustrated, each piezoelectric element 54$f$ has a first electrode, a piezoelectric layer, and a second electrode, which are stacked in the Z1 direction in this order. One of the first electrode and the second electrode is an individual electrode mutually apart for each piezoelectric element 54$f$, and the drive signal Com is applied to the one electrode. The other of the first electrode and the second electrode is a strip-shaped common electrode extending in the direction along the Y axis so as to be continuous over the plurality of piezoelectric elements 54$f$, and a predetermined reference potential is supplied to the other electrode. Examples of the metal materials of these electrodes include metal materials such as platinum, aluminum, nickel, gold, and copper and, among these, one can be used alone or two or more can be used in combination in the aspect of alloy, stacking, or the like. The piezoelectric layer is made of a piezoelectric material such as lead zirconate titanate and has, for example, a strip shape extending in the direction along the Y axis so as to be continuous over the plurality of piezoelectric elements 54$f$. However, the piezoelectric layer may be integrated over the plurality of piezoelectric elements 54$f$. In the piezoelectric layer in this case, a through hole penetrating the piezoelectric layer and extending in the direction along the X axis is provided in the region corresponding to the gap between the adjacent pressure chambers CB in plan view. When the diaphragm 54$e$ vibrates in conjunction with the deformation of the piezoelectric element 54$f$, the pressure in the pressure chamber CB fluctuates and ink is ejected from the nozzle N. It should be noted that as the drive element, a heating element heating the ink in the pressure chamber CB may be used instead of the piezoelectric element 54$f$.

The protective substrate 54$g$ is a plate-shaped member installed on the surface of the diaphragm 54$e$ facing the Z1 direction, protects the plurality of piezoelectric elements 54$f$, and reinforces the mechanical strength of the diaphragm 54$e$. As illustrated in FIGS. 4 and 5, the protective substrate 54$g$ is provided with an opening hi. The opening hi is a hole through which the wiring substrate 54*i* is passed. In addition, on the surface of the protective substrate 54*g* facing the Z2 direction, two recesses recessed in the Z1 direction are formed respectively corresponding to the two first nozzle row L1 and second nozzle row L2. The plurality of piezoelectric elements 54*f* are accommodated between the recess of the protective substrate 54*g* and the diaphragm 54*e*. The protective substrate 54*g* is configured by, for example, a silicon single crystal substrate.

The filter 54*o* is a plate-shaped or sheet-shaped member stacked on the surface of the communication plate 54*a* facing the Z1 direction. The filter 54*o* captures, for example, foreign matter mixed in ink while allowing the ink to pass.

In the direction along the X axis, the outer shape of the filter 54*o* is identical to or smaller than the outer shapes of the first case 54*m* and the second case 54*n* and larger than the outer shape of the communication plate 54*a*. In the exemplification of FIG. 5, the outer shape of the filter 54*o* is smaller than the outer shape of the second case 54*n* in the direction along the X axis.

The filter 54*o* is provided with a plurality of filter holes h23 through which ink passes and an opening h21. The plurality of filter holes h23 is an example of "plurality of liquid passage holes". The opening h21 is a through hole through which the pressure chamber substrate 54*b* is passed. The plurality of filter holes h23 are provided in a filter hole region FR. In the following description, the filter hole region FR provided with the filter hole h23 communicating with the downstream common liquid chamber DR[L1] may be expressed as a filter hole region FR[L1], and the filter hole region FR provided with the filter hole h23 communicating with the downstream common liquid chamber DR[L2] may be expressed as a filter hole region FR[L2]. The filter hole h23 provided in the filter hole region FR[L1] may be expressed as a filter hole h23[L1], and the filter hole h23 provided in the filter hole region FR[L2] may be expressed as a filter hole h23[L2]. The filter hole region FR is configured by an electroformed filter. The material configuring the electroformed filter is, for example, a Ni—Pd alloy. Alternatively, the material configuring the electroformed filter may be stainless steel.

The first case 54*m* is a member stacked on the surface of the filter 54*o* facing the Z1 direction. The first case 54*m* defines a first common liquid chamber portion UR1, which is a part of the upstream common liquid chamber UR. The first case 54*m* is provided with an opening h31, the first common liquid chamber portion UR1 communicating with the plurality of nozzles N of the first nozzle row L1, and the first common liquid chamber portion UR1 communicating with the plurality of nozzles N of the second nozzle row L2. The opening h31 is a hole through which the wiring substrate 54*i* is passed. The first common liquid chamber portion UR1 is an elongated through hole extending in the direction along the Y axis in plan view in the direction along the Z axis. In the following description, the first common liquid chamber portion UR1 included in the common liquid chamber R[L1] may be expressed as a first common liquid chamber portion UR1[L1], and the first common liquid chamber portion UR1 included in the common liquid chamber R[L2] may be expressed as a first common liquid chamber portion UR1[L2]. The first common liquid chamber portion UR1 is formed by penetrating the first case 54*m* in the direction along the Z axis.

The first case 54*m* has a case beam portion BR1 provided in the first common liquid chamber portion UR1 and extending in the direction along the X axis. In the following description, the case beam portion BR1 provided in the first common liquid chamber portion UR1[L1] may be expressed as a case beam portion BR1[L1], and the case beam portion BR1 provided in the first common liquid chamber portion UR1[L2] may be expressed as a case beam portion BR1[L2]. It should be noted that the case beam portion BR1 is an example of "first beam portion". As illustrated in FIG. 4, three case beam portions BR1[L1] are provided in the first common liquid chamber portion UR1[L1], and three case beam portions BR1[L2] are provided in the first common liquid chamber portion UR1[L2]. In other words, although three case beam portions BR1 are provided corresponding to each of the first nozzle row L1 and the second nozzle row L2, one case beam portion BR1 may be provided corresponding to the first nozzle row L1 and the second nozzle row L2 or two or four or more case beam portions BR1 may be provided corresponding to the first nozzle row L1 and the second nozzle row L2.

The first case 54*m* has four side walls w31 disposed along the X axis. The four side walls w31 are two side walls w31[L1] defining the first common liquid chamber portion UR1[L1] and two side walls w31[L2] defining the first common liquid chamber portion UR1[L2]. Each of the four side walls w31 has a notch k32 in the wall surface that does not define the first common liquid chamber portion UR1. An adhesive 70 for joining the first case 54*m* and the filter 54*o* flows into the notch 32. Accordingly, it is possible to suppress the excess adhesive 70 from moving to the filter hole h23 to block the filter hole h23.

The second case 54*n* is a member stacked on the surface of the first case 54*m* facing the Z1 direction. The second case 54*n* defines a second common liquid chamber portion UR2, which is a part of the upstream common liquid chamber UR. The second case 54*n* is provided with an opening h41 and the plurality of coupling ports IO for ink flow into each common liquid chamber R from the liquid storage portion 10 positioned outside the head chip 54 and outside the liquid ejecting head 50 or ink flow from each common liquid chamber R to the outside of the liquid ejecting head 50. The second common liquid chamber portion UR2 is formed by being recessed in the Z1 direction from a surface SZ2. The surface SZ2 is the surface of the second case 54*n* joined to a surface SZ1 of the first case 54*m*.

The second case 54*n* has four side walls w44 disposed along the X axis. The four side walls w44 are two side walls w44[L1] defining a second common liquid chamber portion UR2[L1] and two side walls w44[L2] defining a second common liquid chamber portion UR2[L2]. Each of the four side walls w44 has a notch k45 in the wall surface that does not define the second common liquid chamber portion UR2. By an adhesive 71 for joining the first case 54*m* and the second case 54*n* flowing into the notch k45, it is possible to suppress the adhesive 71 flowing into the common liquid chamber R as compared with an aspect without the notch k45.

As in the case of the support plate 52*c* described above, the first case 54*m* and the second case 54*n* are made of a resin material such as modified polyphenylene ether resin, polyphenylene sulfide resin, and polypropylene resin. When the first case 54*m* and the second case 54*n* are manufactured, the manufacturing is performed by, for example, injection molding. Specifically, a manufacturer injects a molten resin material into a mold having a cavity identical in shape to each of the first case 54*m* and the second case 54*n*, hardens the resin material in the cavity, and then removes the mold from the hardened resin material.

Figure 7:
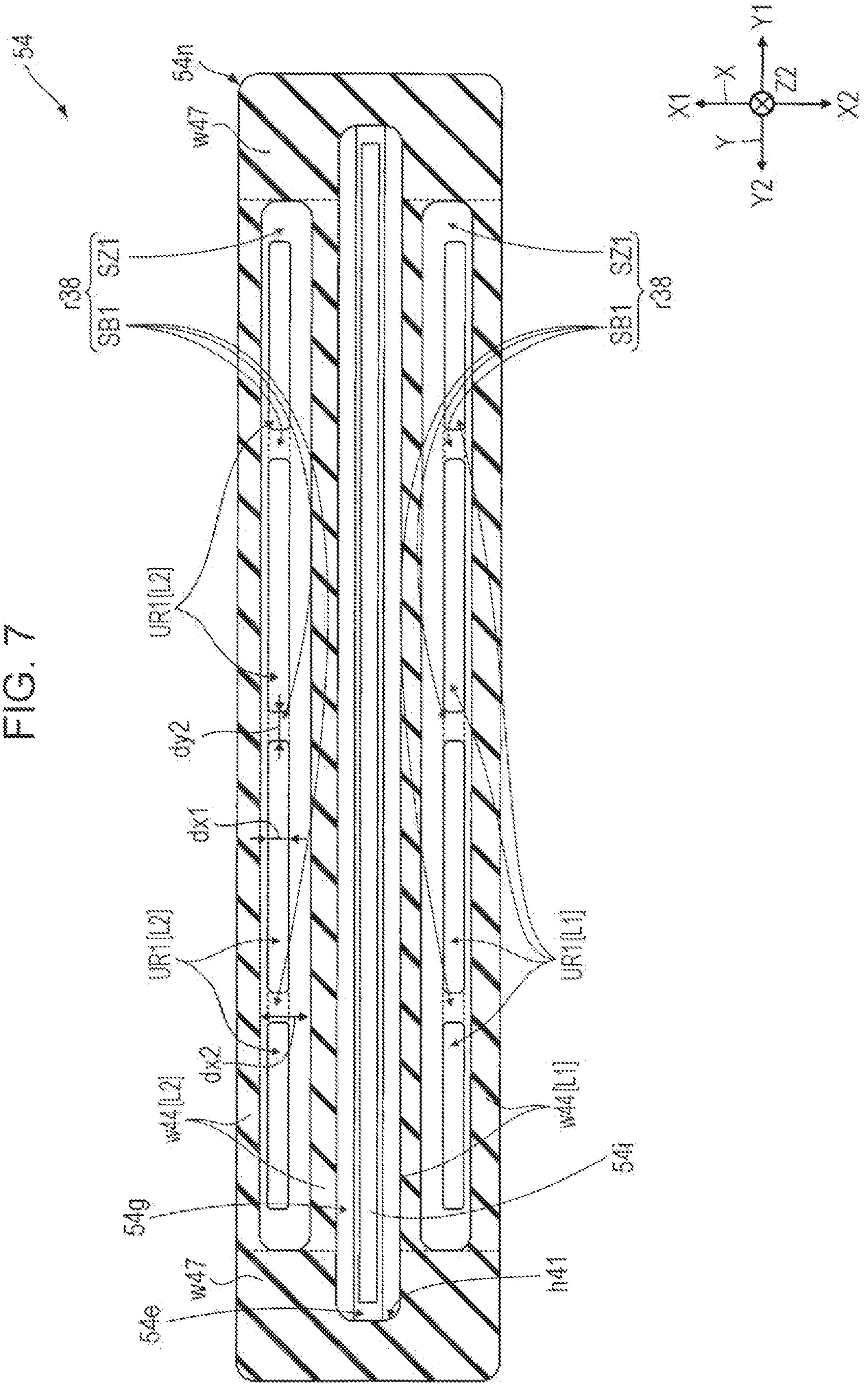
FIG. 7 is a cross-sectional view taken along line VII-VII in FIG. 5.

FIG. 7 is a cross-sectional view taken along line VII-VII in FIG. 5. As can be seen from FIG. 7, when viewed in the Z2 direction, an area r38 of the part defining the second common liquid chamber portion UR2 of the surface SZ1 of the first case 54*m* facing the Z1 direction is larger than an area r39 of the opening formed in the surface SZ1 in order to define the first common liquid chamber portion UR1.

As illustrated in FIG. 5, the second common liquid chamber portion UR2 is positioned in the Z1 direction from the piezoelectric element 54*f*. A width dx2 of the second common liquid chamber portion UR2 in the direction along the X axis is longer than a width dx1 of the first common liquid chamber portion UR1 in the direction along the X axis. The width dx1 is, for example, approximately 0.58 mm. As illustrated in FIG. 5, when viewed in the Z2 direction, the first common liquid chamber portion UR1 does not overlap the protective substrate 54*g*. Meanwhile, the second common liquid chamber portion UR2 overlaps the protective substrate 54*g* when viewed in the Z2 direction. Two objects overlapping means that a part or the whole of one overlaps a part or the whole of the other. In the example of FIG. 5, the second common liquid chamber portion UR2 overlaps the piezoelectric element 54*f* when viewed in the Z2 direction. However, the second common liquid chamber portion UR2 may not overlap the piezoelectric element 54*f* when viewed in the Z2 direction. In addition, as can be seen from FIG. 5, the first common liquid chamber portion UR1 overlaps the protective substrate 54*g* when viewed in the direction along the X axis. Meanwhile, the second common liquid chamber portion UR2 does not overlap the protective substrate 54*g* when viewed in the direction along the X axis.

The vibration absorber 54*d* is also called a compliance substrate, is a flexible resin film configuring the wall surface of the common liquid chamber R, and absorbs pressure fluctuations of the ink in the common liquid chamber R. It should be noted that the vibration absorber 54*d* may be a flexible thin plate made of metal. The surface of the vibration absorber 54*d* facing the Z1 direction is joined to the communication plate 54*a* with an adhesive or the like. Meanwhile, the frame body 54*k* is joined with an adhesive or the like to the surface of the vibration absorber 54*d* facing the Z2 direction. The frame body 54*k* is a frame-shaped member along the outer periphery of the vibration absorber 54*d* and comes into contact with the fixing plate 55 described above. Here, the frame body 54*k* is made of a metal material such as stainless steel, aluminum, titanium, and magnesium alloy.

The wiring substrate 54*i* is mounted on the surface of the diaphragm 54*e* facing the Z1 direction and is a mounting component for electrically coupling the control unit 20 and the head chip 54. The wiring substrate 54*i* is a flexible wiring substrate such as chip on film (COF), flexible printed circuit (FPC), and flexible flat cable (FFC). The drive circuit 54*j* for supplying a drive voltage to each piezoelectric element 54*f* is mounted on the wiring substrate 54*i* of the present embodiment. Based on the control signal S, the drive circuit 54*j* switches whether or not to supply at least a part of the waveform included in the drive signal Com as a drive pulse.

1-5. Regarding First Case 54*m* and Second Case 54*n*

The reason why the case defining the upstream common liquid chamber UR is divided into the first case 54*m* and the second case 54*n* in the first embodiment will be described. Providing the filter 54*o* in the common liquid chamber R results in an increase in flow path resistance in the common liquid chamber R. As the flow path resistance increases, the energy required to supply ink to the nozzle N increases, the power consumption of the liquid ejecting head 50 increases, and thus it is preferable to reduce the flow path resistance. Increasing the volume of the common liquid chamber R is conceivable as a method for reducing the flow path resistance in the common liquid chamber R. However, as illustrated in FIG. 5, due to the layout of the case and the protective substrate 54*g*, the size of the head chip 54 increases in the direction along the Z axis when the common liquid chamber R is extended in the Z1 direction while maintaining the width of the first common liquid chamber portion UR1 along the X axis. Meanwhile, although it is conceivable to extend the common liquid chamber R in the space of the protective substrate 54*g* in the Z1 direction, it is difficult to manufacture by injection molding in one case a complex shape in which the width of the common liquid chamber R in the region overlapping the protective substrate 54*g* is narrowed and the width of the common liquid chamber R in the region not overlapping the protective substrate 54*g* is widened when viewed in the direction along the X axis. More specifically, although injection molding has a step of removing a mold from a hardened resin material, it is difficult to remove the mold from the hardened resin material in the presence of a part where the hardened resin material and the mold are engaged in the direction in which the mold is removed.

In this regard, as illustrated in the first embodiment, the case defining the upstream common liquid chamber UR is divided into the first case 54*m* and the second case 54*n*. As can be seen from FIG. 5, it becomes easy to remove the mold of the first case 54*m* and the mold of the second case 54*n* in the Z2 direction, and thus it becomes easy to manufacture the first case 54*m* and the second case 54*n* while increasing the volume of the common liquid chamber R.

By dividing the case defining the upstream common liquid chamber UR into the first case 54*m* and the second case 54*n*, a phenomenon occurs in which the rigidity of the first case 54*m* decreases as compared with the rigidity of the second case 54*n*. The second case 54*n* has an outer wall in the Z1 direction, and thus the rigidity can be maintained to some extent. In contrast, by forming the first common liquid chamber portion UR1, an elongated opening extending in the direction along the Y axis is formed, and thus the rigidity of the first case 54*m* decreases. As the rigidity of the first case 54*m* decreases, the first case 54*m* may be deformed due to, for example, pressurization in the case of adhesive hardening. In this regard, in the first embodiment, a decrease in the rigidity of the first case 54*m* is suppressed by providing the case beam portion BR1 along the X axis intersecting the Y axis. However, when the case beam portion BR1 is in contact with the filter 540, the plurality of filter holes h23 are blocked in part by the case beam portion BR1 and the effective area of the filter hole region FR becomes narrow. Further, no ink flows between the case beam portion BR1 and the filter 54*o*, which results in a part where air bubbles stay. In the first embodiment, a part where air bubbles stay is suppressed while the case beam portion BR1 is provided.

1-6. Details of Case Beam Portion BR1 and Communication Plate Beam Portion BR2

The case beam portion BR1 is spaced apart from the filter 54*o*. Specifically, in the direction along the Z axis, the case beam portion BR1 is disposed at a distance dz1 from the filter 54*o*. The distance dz1 is the distance from the filter 54*o* to the bottom surface of the case beam portion BR1. In the direction along the Z axis, the dimension of case beam portion BR1 is a distance dz2. The dimension of the first case 54*m* in the direction along the Z axis is a distance dz3. The sum of the distance dz1 and the distance dz2 matches the distance dz3. The distance dz2 is approximately half of the distance dz3. Approximately half of the distance dz3 is specifically 40% to 60% of the distance dz3. Approximately half of the distance dz3 is preferably 45% to 55% of the distance dz3 and more preferably 49% to 51% of the distance dz3. The distance dz1 is, for example, approximately 0.60 mm.

As illustrated in FIG. 6, the case beam portion BR1 and the communication plate beam portion BR2 are misaligned in the direction along the Y axis so as not to overlap when viewed in the Z2 direction. Specifically, in the direction along the Y axis, the case beam portion BR1 closest to the communication plate beam portion BR2 among the three case beam portions BR1 and the communication plate beam portion BR2 are at a distance dy1.

As illustrated in FIG. 6, a surface SB1 of the case beam portion BR1 facing the second case 54*n* is flush with the surface SZ1 of the first case 54*m* facing the second case 54*n*. Being flush means that there is no step between two surfaces. The surface SB1 is an example of "surface of first beam portion facing second case". The surface SZ1 is an example of "surface of first case joined to second case". It should be noted that it can be said that the surface SB1 is a part of the surface SZ1. Meanwhile, the surface of the case beam portion BR1 in the Z2 direction is a tapered surface decreasing in width along the Y axis in the Z2 direction. Although the surface of the case beam portion BR1 in the Z2 direction in the example of FIG. 6 has a semicircular shape protruding in the Z2 direction when viewed in the direction along the X axis, the surface may have a trapezoidal shape having an upper side in the Z2 direction.

As illustrated in FIG. 6, a surface SB2 of the communication plate beam portion BR2 in the Z1 direction is flush with a surface SZ3 of the communication plate 54*a* in the Z1 direction.

As illustrated in FIG. 6, some filter holes h23*f* among the plurality of filter holes h23 are formed at the part of the filter 54*o* stacked on the communication plate beam portion BR2.

In the direction along the Y axis, the outer shape of the filter 54*o* is identical to or smaller than the outer shapes of the first case 54*m* and the second case 54*n* and larger than the outer shape of the communication plate 54*a*. In the exemplification of FIG. 6, the outer shape of the filter 54*o* is smaller than the outer shape of the second case 54*n* in the direction along the Y axis. As can be seen from FIGS. 5 and 6, when viewed in the Z2 direction, the outer shape of the filter 54*o* is identical to or smaller than the outer shape of the second case 54*n* and larger than the outer shape of the communication plate 54*a*.

As illustrated in FIG. 6, the second case 54*n* has two side walls w47 defining the second common liquid chamber portion UR2 and disposed in the direction of the second case 54*n* along the Y axis. The two side walls w47 are the side wall w47 disposed in the Y2 direction and the side wall w47 disposed in the Y1 direction. A tapered surface t48 of the side wall w47 disposed in the Y2 direction separates from the coupling port IO in the Y2 direction from the coupling port IO in the Z2 direction. The tapered surface t48 of the side wall w47 disposed in the Y1 direction separates from the coupling port IO in the Y1 direction from the coupling port IO in the Z2 direction.

1-7. Summary of First Embodiment

The liquid ejecting head 50 has the first nozzle row L1 and the second nozzle row L2, the piezoelectric element 54*f*, and the plurality of stacked components. The first nozzle row L1 and the second nozzle row L2 are configured by arranging the plurality of nozzles N ejecting ink in the Z2 direction in the direction along the Y axis orthogonal to the Z2 direction. The piezoelectric element 54*f* ejects ink from the plurality of nozzles N of the first nozzle row L1 and the second nozzle row L2. The plurality of stacked components define the common liquid chamber R communicating with the plurality of nozzles N of the first nozzle row L1 and the second nozzle row L2. The plurality of stacked components include the filter 54*o*, the first case 54*m*, and the second case 54*n*. The filter 54*o* partitions the common liquid chamber R into the upstream common liquid chamber UR and the downstream common liquid chamber DR. The first case 54*m* defines the first common liquid chamber portion UR1, which is a part of the upstream common liquid chamber UR, and is stacked on the filter 54*o*. The second case 54*n* defines the second common liquid chamber portion UR2, which is a part of the upstream common liquid chamber UR, and is stacked on the first case 54*m*. The second common liquid chamber portion UR2 is positioned in the Z1 direction from the piezoelectric element 54*f*. A width dx2 of the second common liquid chamber portion UR2 in the direction along the X axis is longer than a width dx1 of the first common liquid chamber portion UR1 in the direction along the X axis. According to the first embodiment, even when the upstream common liquid chamber UR has a complex shape in which the width of the upstream common liquid chamber UR in the region overlapping the protective substrate 54*g* is narrow and the width of the upstream common liquid chamber UR in the region not overlapping the protective substrate 54*g* is wide when viewed in the direction along the X axis, manufacturing can be easily performed as compared with an aspect of manufacturing one case that defines the upstream common liquid chamber UR. Accordingly, the width of the head chip 54 in the direction along the Z axis can be reduced as compared with an aspect in which the common liquid chamber R is extended in the Z1 direction while maintaining the width of the first common liquid chamber portion UR1 along the X axis to ensure the same volume as the common liquid chamber of the first embodiment. Since the width of the head chip 54 in the direction along the Z axis can be reduced, the width of the liquid ejecting head 50 in the direction along the Z axis can also be reduced.

The liquid ejecting head 50 further includes the protective substrate 54*g* covering the piezoelectric element 54*f*. The first common liquid chamber portion UR1 overlaps the protective substrate 54*g* when viewed in the direction along the X axis and does not overlap the protective substrate 54*g* when viewed in the Z2 direction. The second common liquid chamber portion UR2 does not overlap the protective substrate 54*g* when viewed in the direction along the X axis and overlaps the protective substrate 54*g* when viewed in the Z2 direction. According to the first embodiment, the common liquid chamber R can be increased in size while maintaining the outer shape of the second case 54*n* not being larger than the outer shape of the first case 54*m* when viewed in the Z2 direction as compared with an aspect in which the second common liquid chamber portion UR2 does not overlap the protective substrate 54*g* when viewed in the Z2 direction.

The first common liquid chamber portion UR1 is formed by penetrating the first case 54*m* in the Z2 direction. The second common liquid chamber portion UR2 is formed by being recessed in the Z1 direction from the surface SZ2 of the second case 54*n*. The first case 54*m* has the case beam portion BR1 provided in the first common liquid chamber portion UR1 and extending in the direction along the X axis. The case beam portion BR1 is spaced apart from the filter 54*o*. According to the first embodiment, although the rigidity of the first case 54*m* decreases as compared with the second case 54*n* having an outer wall in the Z1 direction, the decrease in rigidity can be suppressed by the case beam portion BR1. Further, since the case beam portion BR1 and the filter 54*o* are spaced apart, ink is capable of passing between the case beam portion BR1 and the filter 54*o*, and thus air bubbles can be easily discharged. Further, since the surface of the case beam portion BR1 in the X2 direction is a tapered surface, air bubbles easily move in the Z1 direction, and thus air bubbles can be easily discharged as compared with an aspect in which the surface of the case beam portion BR1 in the X2 direction is not a tapered surface.

The surface SB1 of the case beam portion BR1 facing the second case 54*n* is flush with the surface SZ1 of the first case 54*m* joined to the second case 54*n*. In an aspect in which the surface SB1 is not flush with the surface SZ1, that is, in an aspect in which the surface SB1 has a step with the surface SZ1, it is necessary to manufacture the first case 54*m* such that the surface of the first case 54*m* in the Z1 direction is provided with a step. On the other hand, in an aspect in which the surface SB1 is flush with the surface SZ1, it is not necessary to provide a step on the surface of the first case 54*m* in the Z1 direction, which facilitates the manufacturing of the first case 54*m*. In addition, as compared with an aspect in which the surface SB1 is positioned in the Z2 direction from the surface SZ1, in an aspect in which the surface SB1 is flush with the surface SZ1, the distance from the case beam portion BR1 to the filter 54*o* can be increased on the premise that the width of the case beam portion BR1 in the direction along the Z axis is the same. By increasing the distance from the case beam portion BR1 to the filter 54*o*, ink easily passes between the case beam portion BR1 and the filter 54*o*, and thus air bubbles can be easily discharged.

The distance dz2, which is the dimension of the case beam portion BR1 in the Z2 direction, is approximately half of the distance dz3, which is the dimension of the first case 54*m* in the Z2 direction. As the distance dz2 increases, although the rigidity of the first case 54*m* can be increased, it becomes difficult for ink to pass between the case beam portion BR1 and the filter 54*o*, and thus it becomes difficult to discharge air bubbles. On the other hand, as the distance dz2 decreases, although air bubbles can be easily discharged, the rigidity of the first case 54*m* decreases. According to the first embodiment, since the distance dz2 is approximately half of the distance dz3, it is possible to suppress air bubbles becoming difficult to discharge while maintaining the rigidity of the first case 54*m* to some extent. Further, when the distance dz1 from the filter 54*o* to the bottom surface of the case beam portion BR1 is equal to or greater than the width dx1 of the first common liquid chamber portion UR1 in the direction along the X axis, the effect of pressure loss attributable to providing the case beam portion BR1 can be reduced. In the first embodiment, the distance dz1 is 0.60 mm and the width dx1 is 0.58 mm, and thus the effect of pressure loss attributable to providing the case beam portion BR1 can be reduced as compared with an aspect in which the distance dz1 is shorter than the width dx1. In addition, the distance dz1 from the filter 54*o* to the bottom surface of the case beam portion BR1 is preferably equal to or greater than a width dy2 of the first common liquid chamber portion UR1 in the direction along the Y axis.

The plurality of stacked members that define the common liquid chamber R further include the communication plate 54*a* that defines a part of the downstream common liquid chamber DR. The communication plate 54*a* has the communication plate beam portion BR2 extending in the direction along the X axis. The case beam portion BR1 and the communication plate beam portion BR2 are misaligned in the direction along the Y axis so as not to overlap when viewed in the Z2 direction. In an aspect in which the case beam portion BR1 and the communication plate beam portion BR2 overlap when viewed in the Z2 direction, ink is unlikely to flow into the nozzle N at the same position as the positions of the case beam portion BR1 and the communication plate beam portion BR2 in the direction along the Y axis. Further, in an aspect in which the case beam portion BR1 and the communication plate beam portion BR2 overlap when viewed in the Z2 direction, the space between the case beam portion BR1 and the communication plate beam portion BR2 is narrowed, ink becomes difficult to flow, and thus it is difficult to discharge air bubbles.

Accordingly, according to the first embodiment, it is possible to make it difficult to produce the nozzle N that makes it difficult for ink to flow and it is possible to make it easy to discharge air bubbles as compared with an aspect in which the case beam portion BR1 and the communication plate beam portion BR2 overlap when viewed in the Z2 direction.

The filter 54*o* is stacked on the communication plate 54*a*. The plurality of filter holes h23 through which ink passes are formed in the filter 54*o*. The filter hole h23*f*, which is some of the plurality of filter holes h23, is formed at the part of the filter 54*o* that is stacked on the communication plate beam portion BR2. According to the first embodiment, it becomes easy to manufacture the filter 54*o* as compared with an aspect in which the filter hole h23 is formed while avoiding the part of the filter 54*o* stacked on the communication plate beam portion BR2.

The second case 54*n* has the side wall w44 defining the second common liquid chamber portion UR2 and disposed in the direction of the second case 54*n* along the Y axis and the coupling port IO disposed in the Z1 direction from the surface SZ2 of the second case 54*n* joined to the first case 54*m* so that ink flows in from the outside of the liquid ejecting head 50. The side wall w44 defines the second common liquid chamber portion UR2 and has the tapered surface t48 that separates from the coupling port IO in the direction along the Y axis in the Z2 direction from the coupling port IO. According to the present embodiment, the wall thickness of the second case 54*n* in the Z1 direction can be increased, on the premise that the volume of the second common liquid chamber portion UR2 is the same, as compared with an aspect in which the side wall w44 does not have the tapered surface t48. Further, according to the present embodiment, the volume of the second common liquid chamber portion UR2 can be increased as compared with an aspect in which the side wall w44 does not have the tapered surface t48 and the wall thickness of the second case 54*n* in the Z1 direction is maintained to the end portion in the Z2 direction.

When viewed in the Z2 direction, the area r38 of the part of the surface SZ1 of the first case 54*m* joined to the second case 54*n* defining the second common liquid chamber portion UR2 is larger than the area r39 of the opening formed in the surface SZ1 of the first case 54*m* joined to the second case 54*n* in order to define the first common liquid chamber portion UR1.

The first case 54*m* and the second case 54*n* are made of a resin material. Compared with metals and ceramics, resin materials are generally lightweight and easy to process. However, when a member is made of a resin material, it is difficult to form a complex shape. However, in the first embodiment, by division into two members such as the first case 54*m* and the second case 54*n*, it is possible to easily manufacture a case that defines the upstream common liquid chamber UR having a complex shape while increasing the volume of the upstream common liquid chamber UR. In addition, although a member made of a resin material is lower in rigidity than a member made of metal or ceramics, the case beam portion BR1 is capable of suppressing a decrease in the rigidity of the first case 54*m*.

When viewed in the Z2 direction, the outer shape of the filter 54*o* is identical to or smaller than the outer shape of the second case 54*n* and larger than the outer shape of the communication plate 54*a*. According to the first embodiment, the rigidity of the filter 54*o* can be increased as compared with an aspect in which the outer shape of the filter 54*o* is the same as the outer shape of the communication plate 54*a* when viewed in the Z2 direction. However, when the outer shape of the filter 54*o* is larger than the outer shape of the second case 54*n* when viewed in the Z2 direction, the outer shape of the liquid ejecting head 50 in the direction perpendicular to the Z axis becomes large. Accordingly, according to the first embodiment, the rigidity of the filter 54*o* can be increased, as compared with an aspect in which the outer shape of the filter 54*o* is the same as the outer shape of the communication plate 54*a* when viewed in the Z2 direction, while maintaining the outer shape of the liquid ejecting head 50 in the direction perpendicular to the Z axis.

The liquid ejecting apparatus 100 includes the liquid ejecting head 50 and the liquid storage portion 10 storing a liquid to be supplied to the liquid ejecting head 50. According to the first embodiment, even when the common liquid chamber R is provided with the filter 54*o*, it is possible to provide the liquid ejecting apparatus 100 suppressing an increase in ink pressure loss.

2. Modification Examples

Each form exemplified above can be variously modified. Specific modification aspects are exemplified below. Any two or more aspects selected from the following examples can be combined as appropriate within a mutually consistent range.

2.1. First Modification Example

In the first embodiment, the filter 54*o* is stacked on the communication plate 54*a*, but the present disclosure is not limited thereto. In a first modification example, a spacer 54*p* is provided between the communication plate 54*a* and the filter 54*o*.

Figure 8:
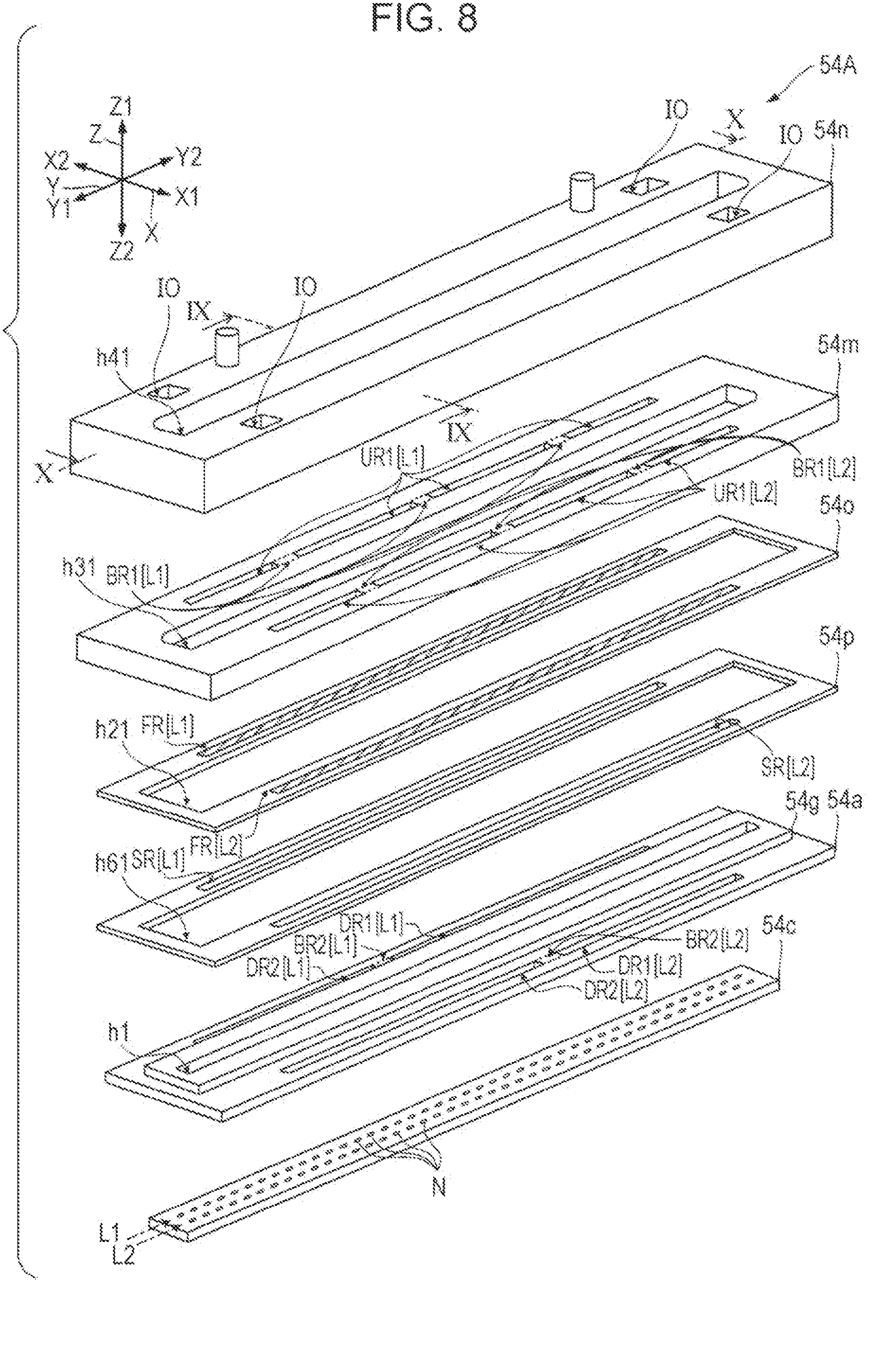
FIG. 8 is an exploded perspective view of a head chip 54A in a first modification example.
Figure 9:
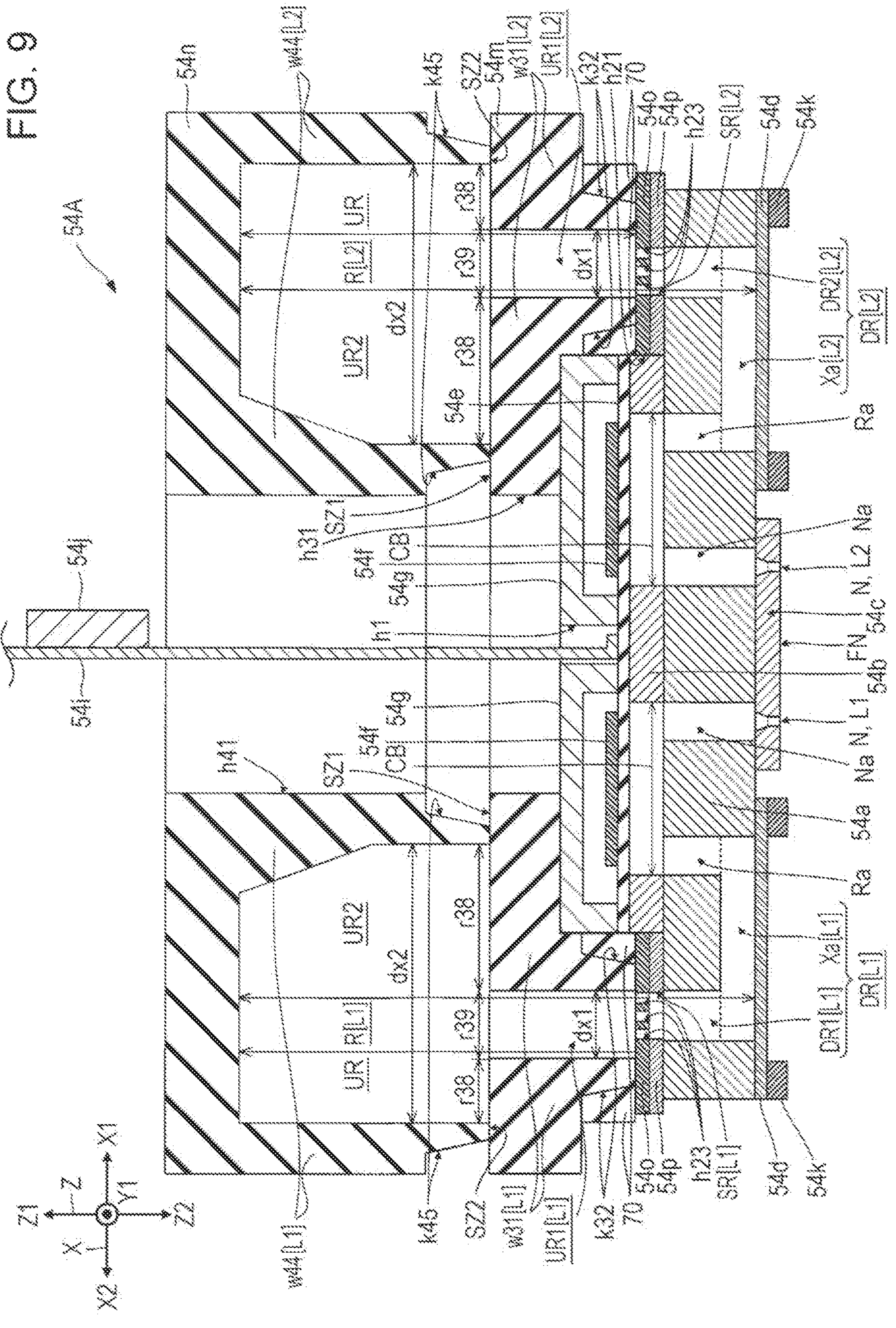
FIG. 9 is a cross-sectional view taken along line IX-IX in FIG. 8.
Figure 10:
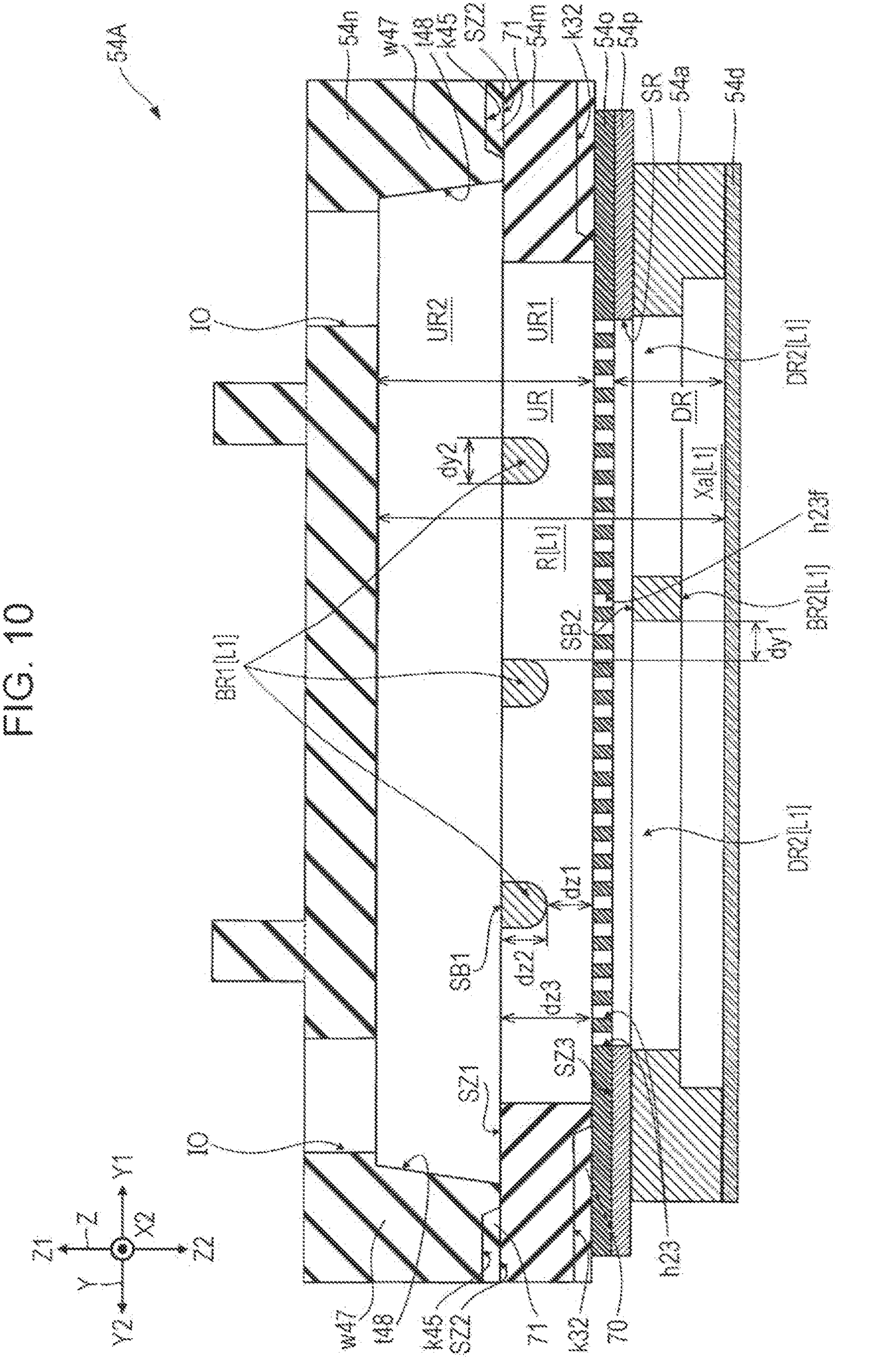
FIG. 10 is a cross-sectional view taken along line X-X in FIG. 8.

FIG. 8 is an exploded perspective view of a head chip 54A in the first modification example. FIG. 9 is a cross-sectional view taken along line IX-IX in FIG. 8. FIG. 10 is a cross-sectional view taken along line X-X in FIG. 8.

The head chip 54A differs from the head chip 54 in that the head chip 54A has the spacer 54*p*. As illustrated in FIGS. 8 to 10, the spacer 54*p* is stacked on the communication plate 54*a*. The filter 54*o* is stacked on the spacer 54*p*.

The spacer 54*p* is used in order to ensure a space between the filter hole h23 and the communication plate 54*a*. The spacer 54*p* is made of metal or ceramics. In the first modification example, the communication plate 54*a* and the spacer 54*p* define a part of the downstream common liquid chamber DR.

As illustrated in FIG. 8, the spacer 54*p* is provided with an opening h61 and two through holes SR. The opening h61 is a through hole through which the pressure chamber substrate 54*b* is passed. One of the two through holes SR communicates with some or all of the plurality of filter holes h23[L1]. The other of the two through holes SR communicates with some or all of the plurality of filter holes h23[L2]. Hereinafter, the through hole SR communicating with some or all of the plurality of filter holes h23[L1] may be expressed as a through hole SR[L1], and the through hole SR communicating with some or all of the plurality of filter holes h23[L2] may be expressed as a through hole SR[L2]. In order to increase the effective area of the filter hole region FR, it is preferable that the through hole SR[L1] communicates with all of the plurality of filter holes h23[L1] and the through hole SR[L2] communicates with all of the plurality of filter holes h23[L2]. As illustrated in FIG. 10, among the plurality of filter holes h23, the filter hole h23*f* that overlaps the communication plate beam portion BR2 overlaps the through hole SR when viewed in the Z2 direction.

In the first modification example described above, the plurality of stacked components that define the common liquid chamber R further include the spacer 54*p* that defines a part of the downstream common liquid chamber DR. The filter 54*o* is stacked on the spacer 54*p*. The plurality of filter holes h23*f* through which ink passes are formed in the filter 54*o*. The spacer 54*p* is stacked on the communication plate 54*a*. The spacer 54*p* is made of metal or ceramics. The spacer 54*p* has the through hole SR formed by penetrating the spacer 54*p* in the Z2 direction. When viewed in the Z2 direction, the filter hole h23*f* that overlaps the communication plate beam portion BR2 among the plurality of filter holes h23*f* overlaps the through hole SR. Since the spacer 54*p* is made of metal or ceramics higher in rigidity than a resin material, deformation of the spacer 54*p* can be suppressed as compared with an aspect in which the spacer 54*p* is made of a resin material. In addition, since the through hole SR is capable of ensuring a space between the communication plate beam portion BR2 and the filter hole h23*f*, blocking of the filter hole h23*f* can be suppressed. Accordingly, narrowing of the effective area of the filter hole region FR can be suppressed.

2.2. Second Modification Example

In each aspect described above, the surface SB1 of the case beam portion BR1 facing the second case 54*n* is flush with the surface SZ1 of the first case 54*m* facing the second case 54*n*, but the surface SB1 may be positioned in the Z2 direction relative to the surface SZ1.

2.3. Third Modification Example

In each aspect described above, the distance dz2, which is the dimension of the case beam portion BR1 in the Z2 direction, is approximately half of the distance dz3, which is the dimension of the first case 54*m* in the Z2 direction, but the present disclosure is not limited thereto. For example, the distance dz2 may be shorter than approximately half of the distance dz3. In that case, the first case 54*m* is preferably made of metal or ceramics higher in rigidity than a resin material. In addition, the distance dz2 may be longer than approximately half of the distance dz3.

2.4. Fourth Modification Example

In each aspect described above, the communication plate 54*a* is provided with the communication plate beam portion BR2, but the communication plate beam portion BR2 may not be provided.

2.5. Fifth Modification Example

In each aspect described above, the side wall w47 of the second case 54*n* has the tapered surface t48, but the tapered surface t48 may not be provided.

2.6. Sixth Modification Example

In each aspect described above, when viewed in the Z2 direction, the area r38 of the surface SZ1 of the first case 54*m* joined to the second case 54*n* is larger than the area r39 of the opening formed in the surface SZ1 of the first case 54*m* joined to the second case 54*n*, but the present disclosure is not limited thereto. For example, the area r38 may be the same size as or smaller than the area r39.

2.7. Seventh Modification Example

In each aspect described above, the first case 54*m* has the case beam portion BR1, but the first case 54*m* may not have the case beam portion BR1. For example, by forming the first case 54*m* with metal or ceramics instead of a resin material, rigidity may be provided to the extent that deformation can be suppressed during post-adhesive application pressurization even when the first case 54*m* does not have the case beam portion BR1. In addition, the second case 54*n* may be made of metal or ceramics instead of a resin material.

2.8. Eighth Modification Example

In each of the above forms, the serial liquid ejecting apparatus 100 in which the support body 41 supporting the liquid ejecting head 50 is caused to reciprocate is exemplified, but it is also possible to apply the present disclosure to a line-type liquid ejecting apparatus in which the plurality of nozzles N are distributed over the entire width of the medium M. In other words, the support body supporting the liquid ejecting head 50 is not limited to a serial carriage and may be a structure that supports the liquid ejecting head 50 in a line type. In this case, for example, a plurality of the liquid ejecting heads 50 are disposed side by side in the width direction of the medium M and the plurality of liquid ejecting heads 50 are collectively supported by one support body.

2.9. Ninth Modification Example

The liquid ejecting apparatus exemplified in the above form can be employed in various types of equipment such as facsimile machines and copiers in addition to printing-only equipment. However, the application of the liquid ejecting apparatus is not limited to printing. For example, a liquid ejecting apparatus that ejects a coloring material solution is used as a manufacturing apparatus forming a color filter for a display device such as a liquid crystal display panel. In addition, a liquid ejecting apparatus that ejects a solution of a conductive material is used as a manufacturing apparatus forming wiring and electrodes of a wiring substrate. In addition, a liquid ejecting apparatus that ejects a solution of living organism-related organic matter is used as, for example, a manufacturing apparatus manufacturing biochips or the like.

3. Additional Notes

The following configuration, for example, can be grasped from the form exemplified above.

A liquid ejecting head according to Aspect 1, which is a preferred aspect, includes: a nozzle row configured by arranging a plurality of nozzles ejecting a liquid in a first direction in a second direction orthogonal to the first direction; a drive element for ejecting the liquid from the plurality of nozzles of the nozzle row; and a plurality of stacked components defining a common liquid chamber communicating with the plurality of nozzles of the nozzle row, in which the plurality of stacked components include a filter partitioning the common liquid chamber into an upstream common liquid chamber and a downstream common liquid chamber, a first case defining a first common liquid chamber portion as a part of the upstream common liquid chamber and stacked on the filter, and a second case defining a second common liquid chamber portion as a part of the upstream common liquid chamber and stacked on the first case, the second common liquid chamber portion is positioned in a direction opposite to the first direction from the drive element, and a width of the second common liquid chamber portion in a third direction orthogonal to the first direction and the second direction is longer than a width of the first common liquid chamber portion in the third direction. According to Aspect 1, even when the upstream common liquid chamber has a complex shape in which the width of the common liquid chamber R in the region overlapping the protective substrate is narrow and the width of the common liquid chamber in the region not overlapping the protective substrate is wide when viewed in the third direction, manufacturing can be easily performed as compared with an aspect of manufacturing one case that defines the upstream common liquid chamber. Accordingly, the width of the liquid ejecting head in the first direction can be reduced as compared with an aspect in which the common liquid chamber is extended in the direction opposite to the first direction while maintaining the width of the first common liquid chamber portion in the third direction to ensure the same volume as the common liquid chamber of Aspect 1.

The liquid ejecting head according to Aspect 2, which is a specific example of Aspect 1, further includes a protective substrate covering the drive element, in which the first common liquid chamber portion overlaps the protective substrate when viewed in the third direction and does not overlap the protective substrate when viewed in the first direction, and the second common liquid chamber portion does not overlap the protective substrate when viewed in the third direction and overlaps the protective substrate when viewed in the first direction. According to Aspect 2, the common liquid chamber R can be increased in size while maintaining the outer shape of the second case not being larger than the outer shape of the first case when viewed in the first direction as compared with an aspect in which the second common liquid chamber portion does not overlap the protective substrate when viewed in the first direction.

In Aspect 3, which is a specific example of Aspect 1 or 2, the first common liquid chamber portion is formed by penetrating the first case in the first direction, the second common liquid chamber portion is formed by being recessed in the direction opposite to the first direction from a surface of the second case joined to the first case, the first case has a first beam portion provided in the first common liquid chamber portion and extending in the third direction, and the first beam portion is spaced apart from the filter. According to Aspect 3, although the rigidity of the first case decreases as compared with the second case having an outer wall in the direction opposite to the first direction, the decrease in rigidity can be suppressed by the first beam portion. Further, since the first beam portion and the filter are spaced apart, the liquid is capable of passing between the first beam portion and the filter, and thus air bubbles can be easily discharged.

In Aspect 4, which is a specific example of Aspect 3, a surface of the first beam portion facing the second case is flush with a surface of the first case joined to the second case. In Aspect 4, in an aspect in which there is a step between the surface of the first beam portion facing the second case and the surface of the first case joined to the second case, it is necessary to manufacture the first case such that the surface of the first case in the direction opposite to the first direction is provided with a step. On the other hand, in Aspect 4, it is not necessary to provide a step on the surface of the first case in the direction opposite to the first direction, which facilitates the manufacturing of the first case.

In Aspect 5, which is a specific example of Aspect 4, a dimension of the first beam portion in the first direction is approximately half of a dimension of the first case in the first direction. As the dimension of the first beam portion in the first direction increases, although the rigidity of the first case can be increased, it becomes difficult for the liquid to pass between the first beam portion and the filter, and thus it becomes difficult to discharge air bubbles. On the other hand, as the dimension of the first beam portion in the first direction decreases, although air bubbles can be easily discharged, the rigidity of the first case decreases. According to Aspect 5, it is possible to suppress air bubbles becoming difficult to discharge while maintaining the rigidity of the first case to some extent.

In Aspect 6, which is a specific example of any one of Aspects 3 to 5, the plurality of stacked components further include a communication plate defining a part of the downstream common liquid chamber, the communication plate has a second beam portion extending in the third direction, and the first beam portion and the second beam portion are misaligned in the second direction so as not to overlap when viewed in the first direction. In an aspect in which the first beam portion and the second beam portion overlap when viewed in the first direction, the liquid is unlikely to flow into the nozzle at the same position as the positions of the first beam portion and the second beam portion in the second direction. Further, in an aspect in which the first beam portion and the second beam portion overlap when viewed in the first direction, the space between the first beam portion and the second beam portion is narrowed as compared with Aspect 6, the liquid becomes difficult to flow, and thus it is difficult to discharge air bubbles. According to Aspect 6, it is possible to make it difficult to produce the nozzle that makes it difficult for the liquid to flow and it is possible to make it easy to discharge air bubbles as compared with an aspect in which the first beam portion and the second beam portion overlap when viewed in the first direction.

In Aspect 7, which is a specific example of Aspect 6, the filter is stacked on the communication plate, a plurality of holes through which the liquid passes are formed in the filter, and some of the plurality of holes are formed at a part of the filter stacked on the second beam portion. According to Aspect 7, it becomes easy to manufacture the filter as compared with an aspect in which a hole is formed while avoiding the part of the filter stacked on the second beam portion.

In Aspect 8, which is a specific example of Aspect 6, the plurality of stacked components further include a spacer defining a part of the downstream common liquid chamber, the filter is stacked on the spacer, a plurality of holes through which the liquid passes are formed in the filter, the spacer is stacked on the communication plate, the spacer is made of metal or ceramics, the spacer has a through hole formed by penetrating the spacer in the first direction, and when viewed in the first direction, the hole overlapping the second beam portion among the plurality of holes of the filter overlaps the through hole of the spacer. According to Aspect 8, since the spacer is made of metal or ceramics higher in rigidity than a resin material, deformation of the spacer can be suppressed as compared with an aspect in which the spacer is made of a resin material. In addition, since the through hole is capable of ensuring a space between the second beam portion and the filter hole, blocking of the filter hole can be suppressed. Accordingly, narrowing of the effective area of the filter can be suppressed.

In Aspect 9, which is a specific example of any one of Aspects 1 to 8, the second case has a side wall defining the second common liquid chamber portion and disposed in the second direction of the second case and a coupling port disposed in the direction opposite to the first direction from a surface of the second case joined to the first case so that the liquid flows in from an outside or the liquid flows to the outside, and the side wall defines the second common liquid chamber portion and has a tapered surface separating from the coupling port in the second direction from the coupling port in the first direction. According to Aspect 9, the wall thickness of the second case in the direction opposite to the first direction can be increased, on the premise that the volume of the second common liquid chamber portion is the same, as compared with an aspect in which the side wall does not have the tapered surface. Further, according to Aspect 9, the volume of the second common liquid chamber portion can be increased as compared with an aspect in which the side wall does not have the tapered surface and the wall thickness of the second case in the direction opposite to the first direction is maintained to the end portion in the first direction.

In Aspect 10, which is a specific example of any one of Aspects 1 to 9, when viewed in the first direction, an area of a part of a surface of the first case joined to the second case defining the second common liquid chamber portion is larger than an area of an opening formed in the surface of the first case joined to the second case in order to define the first common liquid chamber portion.

In Aspect 11, which is a specific example of any one of Aspects 1 to 10, the first case and the second case are made of a resin material. Compared with metals and ceramics, resin materials are generally lightweight and easy to process. However, when a member is made of a resin material, it is difficult to form a complex shape. However, in Aspect 11, by division into two members such as the first case and the second case, it is possible to easily manufacture a case that defines the upstream common liquid chamber having a complex shape while increasing the volume of the upstream common liquid chamber. In addition, although a member made of a resin material is lower in rigidity than a member made of metal or ceramics, the first beam portion is capable of suppressing a decrease in the rigidity of the first case.

In Aspect 12, which is a specific example of any one of Aspects 1 to 11, the plurality of stacked components further include a communication plate defining at least a part of the downstream common liquid chamber in the second direction and the third direction, and when viewed in the first direction, an outer shape of the filter is identical to or smaller than an outer shape of the second case and larger than an outer shape of the communication plate. According to Aspect 12, the rigidity of the filter can be increased as compared with an aspect in which the outer shape of the filter is the same as the outer shape of the communication plate when viewed in the first direction. However, when the outer shape of the filter is larger than the outer shape of the second case when viewed in the first direction, the outer shape of the liquid ejecting head in the direction perpendicular to the first direction becomes large. Accordingly, according to Aspect 12, the rigidity of the filter can be increased, as compared with an aspect in which the outer shape of the filter is the same as the outer shape of the communication plate when viewed in the first direction, while maintaining the outer shape of the liquid ejecting head in the direction perpendicular to the first direction.

A liquid ejecting apparatus according to Aspect 13, which is a preferred aspect, includes: the liquid ejecting head according to any one of Aspects 1 to 12; and a liquid storage portion storing the liquid to be supplied to the liquid ejecting head. Even when the common liquid chamber is provided with the filter, it is possible to provide the liquid ejecting apparatus 100 suppressing an increase in liquid pressure loss.

What is claimed is:

1. A liquid ejecting head comprising:

a nozzle row configured by arranging nozzles, configured to eject a liquid in a first direction, in a second direction orthogonal to the first direction;

a drive element for ejecting the liquid from the nozzles of the nozzle row;

stacked components defining a common liquid chamber communicating with the nozzles of the nozzle row; and a protective substrate covering the drive element, wherein the stacked components include a filter partitioning the common liquid chamber into an upstream common liquid chamber and a downstream common liquid chamber, a first case defining a first common liquid chamber portion as a part of the upstream common liquid chamber and stacked on the filter, and a second case defining a second common liquid chamber portion as a part of the upstream common liquid chamber and stacked on the first case, the second common liquid chamber portion is positioned in a direction opposite to the first direction from the drive element, a width of the second common liquid chamber portion in a third direction orthogonal to the first direction and the second direction is longer than a width of the first common liquid chamber portion in the third direction, the first common liquid chamber portion overlaps the protective substrate when viewed in the third direction and does not overlap the protective substrate when viewed in the first direction, and the second common liquid chamber portion does not overlap the protective substrate when viewed in the third direction and overlaps the protective substrate when viewed in the first direction.

2. The liquid ejecting head according to claim 1, wherein the first common liquid chamber portion is formed by penetrating the first case in the first direction, the second common liquid chamber portion is formed by being recessed in the direction opposite to the first direction from a second surface of the second case joined to the first case, the first case has a first beam portion provided in the first common liquid chamber portion and extending in the third direction, and the first beam portion is spaced apart from the filter.

3. The liquid ejecting head according to claim 2, wherein a surface of the first beam portion facing the second case is flush with a first surface of the first case joined to the second case.

4. The liquid ejecting head according to claim 3, wherein a dimension of the first beam portion in the first direction is approximately half of a dimension of the first case in the first direction.

5. The liquid ejecting head according to claim 2, wherein the stacked components further include a communication plate defining a part of the downstream common liquid chamber, the communication plate has a second beam portion extending in the third direction, and the first beam portion and the second beam portion are misaligned in the second direction so as not to overlap when viewed in the first direction.

6. The liquid ejecting head according to claim 5, wherein the filter is stacked on the communication plate, holes through which the liquid passes are formed in the filter, and some of the holes are formed at a part of the filter stacked on the second beam portion.

7. The liquid ejecting head according to claim 5, wherein the stacked components further include a spacer defining a part of the downstream common liquid chamber, the filter is stacked on the spacer, holes through which the liquid passes are formed in the filter, the spacer is stacked on the communication plate, the spacer is made of metal or ceramics, the spacer has a through hole formed by penetrating the spacer in the first direction, and when viewed in the first direction, the hole overlapping the second beam portion among the holes of the filter overlaps the through hole of the spacer.

8. The liquid ejecting head according to claim 1, wherein the first case has one or a plurality of openings formed in a first surface of the first case joined to the second case in order to define the first common liquid chamber portion, and when viewed in the first direction, an area of a part of the first surface defining the second common liquid chamber portion is larger than an area of the one or the plurality of openings.

9. The liquid ejecting head according to claim 1, wherein the first case and the second case are made of a resin material.

10. The liquid ejecting head according to claim 1, wherein the stacked components further include a communication plate defining at least a part of the downstream common liquid chamber in the second direction and the third direction, and when viewed in the first direction, an outer shape of the filter is identical to or smaller than an outer shape of the second case and larger than an outer shape of the communication plate.

11. A liquid ejecting apparatus comprising:

the liquid ejecting head according to claim 1; and a liquid storage portion storing a liquid to be supplied to the liquid ejecting head.

12. A liquid ejecting head comprising:

a nozzle row configured by arranging nozzles, configured to eject a liquid in a first direction, in a second direction orthogonal to the first direction;

a drive element for ejecting the liquid from the nozzles of the nozzle row; and stacked components defining a common liquid chamber communicating with the nozzles of the nozzle row, wherein the stacked components include a filter partitioning the common liquid chamber into an upstream common liquid chamber and a downstream common liquid chamber, a first case defining a first common liquid chamber portion as a part of the upstream common liquid chamber and stacked on the filter, and a second case defining a second common liquid chamber portion as a part of the upstream common liquid chamber and stacked on the first case, the second common liquid chamber portion is positioned in a direction opposite to the first direction from the drive element, a width of the second common liquid chamber portion in a third direction orthogonal to the first direction and the second direction is longer than a width of the first common liquid chamber portion in the third direction, the second case has a side wall defining the second common liquid chamber portion and disposed in the second direction of the second case and a coupling port disposed in the direction opposite to the first direction from a second surface of the second case joined to the first case so that the liquid flows in from an outside or the liquid flows to the outside, and the side wall defines the second common liquid chamber portion and has a tapered surface separating from the coupling port in the second direction from the coupling port in the first direction.

13. The liquid ejecting head according to claim 12, wherein the first common liquid chamber portion is formed by penetrating the first case in the first direction, the second common liquid chamber portion is formed by being recessed in the direction opposite to the first direction from the second surface, the first case has a first beam portion provided in the first common liquid chamber portion and extending in the third direction, and the first beam portion is spaced apart from the filter.

14. A liquid ejecting head comprising:

a nozzle row configured by arranging nozzles, configured to eject a liquid in a first direction, in a second direction orthogonal to the first direction;

a drive element for ejecting the liquid from the nozzles of the nozzle row; and stacked components defining a common liquid chamber communicating with the nozzles of the nozzle row, wherein the stacked components include a filter partitioning the common liquid chamber into an upstream common liquid chamber and a downstream common liquid chamber, a first case defining a first common liquid chamber portion as a part of the upstream common liquid chamber and stacked on the filter, and a second case defining a second common liquid chamber portion as a part of the upstream common liquid chamber and stacked on the first case, the second common liquid chamber portion is positioned in a direction opposite to the first direction from the drive element, a width of the second common liquid chamber portion in a third direction orthogonal to the first direction and the second direction is longer than a width of the first common liquid chamber portion in the third direction, the first case has a first opening formed in a first surface of the first case directly joined to the second case in order to define the first common liquid chamber portion, the second case has a second opening formed in a second surface of the second case directly joined to the first case in order to define the second common liquid chamber portion, and the first opening is directly connected with the second opening so that the first common liquid chamber portion is in communication with the second common liquid chamber portion.

15. The liquid ejecting head according to claim 14, wherein the first case has one or a plurality of openings formed in the first surface, the one or the plurality of openings including at least the first opening, and when viewed in the first direction, an area of a part of the first surface defining the second common liquid chamber portion is larger than an area of the one or the plurality of openings.

* * * * *